(12) United States Patent
Wang

(10) Patent No.: US 11,774,625 B2
(45) Date of Patent: Oct. 3, 2023

(54) SYSTEMS AND METHODS FOR SECURITY INSPECTION

(71) Applicant: ZHEJIANG DAHUA TECHNOLOGY CO., LTD., Zhejiang (CN)

(72) Inventor: Qiaoxue Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 260 days.

(21) Appl. No.: 17/229,893

(22) Filed: Apr. 14, 2021

(65) Prior Publication Data

US 2021/0255354 A1    Aug. 19, 2021

Related U.S. Application Data

(63) Continuation of application No. PCT/CN2019/089517, filed on May 31, 2019.

(30) Foreign Application Priority Data

Nov. 7, 2018   (CN) .......................... 201811321434.6

(51) Int. Cl.
  *G01V 5/00*   (2006.01)
(52) U.S. Cl.
  CPC .................................. *G01V 5/0016* (2013.01)
(58) Field of Classification Search
  CPC .. G01V 5/0016; G01V 5/0033; G01V 5/0041; G01V 5/0025
  See application file for complete search history.

(56) References Cited

U.S. PATENT DOCUMENTS

| 9,552,521 B2* | 1/2017 | Chen | G06V 20/52 |
| 10,228,486 B2* | 3/2019 | Sossong | G01T 1/167 |

(Continued)

FOREIGN PATENT DOCUMENTS

| CN | 203894809 U | 10/2014 |
| CN | 104464058 A | 3/2015 |

(Continued)

OTHER PUBLICATIONS

International Search Report in PCT/CN2019/089517 dated Aug. 28, 2019, 5 pages.

(Continued)

*Primary Examiner* — David P Porta
*Assistant Examiner* — Fani Polyzos Boosalis
(74) *Attorney, Agent, or Firm* — METIS IP LLC

(57) ABSTRACT

The present disclosure relates to a security inspection system. The system may include a re-inspection apparatus and a monitoring platform. The monitoring platform may receive information relating to a suspect article in a package and information relating to an electronic tag attached to the package. The monitoring platform may also generate re-inspection instructions for the package based on the information relating to the suspect article and the information relating to the electronic tag, and send the re-inspection instructions to the re-inspection apparatus. The re-inspection apparatus may re-inspect the suspect article in the package based on the re-inspection instructions. The information relating to the suspect article may be generated and sent by a security inspection machine. The information relating to the electronic tag may be generated and sent by a labelling apparatus. The package with the electronic tag may be delivered to the re-inspection apparatus by a distribution apparatus.

18 Claims, 13 Drawing Sheets

(56) References Cited

U.S. PATENT DOCUMENTS

2005/0024199 A1  2/2005  Huey et al.
2016/0252646 A1  9/2016  Sarraiocco

FOREIGN PATENT DOCUMENTS

| CN | 105068135 A | 11/2015 |
|----|-------------|---------|
| CN | 105116461 A | 12/2015 |
| CN | 206193265 U | 5/2017 |
| CN | 107688884 A | 2/2018 |
| CN | 207051218 U | 2/2018 |
| CN | 107843942 A | 3/2018 |
| CN | 108268806 A | 7/2018 |
| CN | 108453057 A | 8/2018 |
| EP | 3346291 A1 | 7/2018 |
| JP | 2005300761 A | 10/2005 |
| WO | 2017101282 A1 | 6/2017 |
| WO | 2020093689 A1 | 5/2020 |

OTHER PUBLICATIONS

Written Opinion in PCT/CN2019/089517 dated Aug. 28, 2019, 5 pages.
First Office Action in Chinese Application No. 201811321434.6 dated Jul. 23, 2019, 29 pages.
The Extended European Search Report in European Application No. 19881360.2 dated Oct. 28, 2021, 10 pages.

\* cited by examiner

800

SYSTEMS AND METHODS FOR SECURITY INSPECTION

CROSS-REFERENCE TO RELATED APPLICATIONS

This application is a Continuation of International Application No. PCT/CN2019/089517, filed on May 31, 2019, which claims priority to Chinese Application No. 201811321434.6, filed on Nov. 7, 2018, the entire contents of each of which are hereby incorporated by reference.

TECHNICAL FIELD

The present disclosure relates to the field of security inspection, and in particular, to systems and methods for security inspection that can detect suspect articles.

BACKGROUND

With frequent population flow, security inspection systems play more and more important roles in public places, such as bus stations, train stations, airports, scenic spots, border checkpoints, etc. Currently, security inspection machines are used to perform inspections on packages. In general, the security inspection is performed depending on the coordination of security staffs. For instance, the security inspection machine obtains an X-ray image of the package and analyzes the X-ray image to determine whether suspect article(s) (e.g., suspect tools, suspect liquids, suspect explosives) are in the package. Once it is determined that the package includes suspect article(s), the security inspection machine can send an alarm to remind a security staff. Then, the security staff will open the package and re-inspect the articles in the package. The whole process is cumbersome and labor intensive, resulting in high cost and low overall security inspection efficiency. Thus, it is desirable to provide systems and methods for security inspection with high efficiency.

SUMMARY

In one aspect of the present disclosure, a security inspection system is provided. The security inspection system may include a re-inspection apparatus and a monitoring platform. The monitoring platform may be configured to receive information relating to a suspect article in a package and information relating to an electronic tag attached to the package; generate re-inspection instructions for the package based on the information relating to the suspect article and the information relating to the electronic tag; and send the re-inspection instructions to the re-inspection apparatus. The re-inspection apparatus may be configured to re-inspect the suspect article in the package based on the re-inspection instructions. The information relating to the suspect article may be generated and sent by a security inspection machine. The information relating to the electronic tag may be generated and sent by a labelling apparatus. The package with the electronic tag may be delivered to the re-inspection apparatus by a distribution apparatus.

In some embodiments, the security inspection system may also include the security inspection machine, which is configured to capture a first image of the package by scanning the package with X-ray.

In some embodiments, the security inspection system may further include a display screen. The security inspection machine may be further configured to obtain a second image of the package by photographing the package, and send the second image and the first image of the package to the monitoring platform. The monitoring platform may be further configured to send the second image and the first image to the display screen for display.

In some embodiments, the monitoring platform may be configured to perform an image matting for the suspect article in the first image to obtain a processed first image; and send the processed first image to the display screen for display.

In some embodiments, the re-inspection apparatus may include a plurality of re-inspection components, each of which configured to inspect a type of suspect articles. The monitoring platform may be further configured to determine a target re-inspection component corresponding to the suspect article among the plurality of re-inspection components; obtain a third image of the target re-inspection component; and send the third image of the target re-inspection component to the display screen for display.

In some embodiments, the monitoring platform may be further configured to determine a display mode of the information relating to the suspect article and the third image of the target re-inspection component. The display screen may be configured to display the information relating to the suspect article and the third image of the target re-inspection component based on the display mode.

In some embodiments, to re-inspect the suspect article in the package based on the re-inspection instructions, the re-inspection apparatus may be further configured to identify the package based on the information relating to the electronic tag in the re-inspection instructions; and re-inspect the suspect article in the package based on the information relating to the suspect article in the re-inspection instructions.

In some embodiments, to re-inspect the suspect article, the re-inspection apparatus may be configured to detect an article to be re-inspected in the package; generate a fourth image of the article to be re-inspected, wherein the fourth image is a visible light image of the article to be re-inspected; compare the fourth image with the first image of the suspect article; and in response to a determination that the article to be re-inspected is the suspect article based on the comparison result, re-inspect the article.

In some embodiments, the re-inspection apparatus may include a confiscation component configured to confiscate the suspect article if the suspect article is determined as a contraband.

In some embodiments, the re-inspection apparatus may be further configured to send a re-inspection result to the monitoring platform. The monitoring platform may be further configured to determine a correspondence of the information relating to the electronic tag and the information relating to the suspect article; set a security status of the electronic tag as pending; determine whether all suspect articles in the package have been re-inspected based on the re-inspection result and the correspondence; if one or more suspect articles are not been re-inspected, send second re-inspection instructions for the one or more suspect articles to the re-inspection apparatus; or if all the suspect articles have been re-inspected, update the security status of the electronic tag as inspected.

In some embodiments, the security inspection system may further include an electronic tag detection apparatus. The electronic tag detection apparatus may be configured to detect the electronic tag of the package after being re-inspected; and if the electronic tag is detected, send the information of the electronic tag to the monitoring platform.

The monitoring platform may be configured to determine the security status of the electronic tag; and if the security status of the electronic tag is pending, send alarm instructions to the electronic tag detection apparatus. The electronic tag detection apparatus may be further configured to output alarm information based on the alarm instructions.

In another aspect of the present disclosure, a security inspection method is provided. The method may be implemented on a computing device having at least one processor, at least one computer-readable storage medium, and a communication platform connected to the network. The method may include receiving, by a monitoring platform, information relating to a suspect article in a package and information relating to an electronic tag attached to the package; generating, by the monitoring platform, re-inspection instructions for the package based on the information relating to the suspect article and the information relating to the electronic tag; sending, by the monitoring platform, the re-inspection instructions to a re-inspection apparatus; and re-inspecting, by the re-inspection apparatus, the suspect article in the package based on the re-inspection instructions. The information relating to the suspect article may be generated and sent by a security inspection machine. The information relating to the electronic tag may be generated and sent by a labelling apparatus. The package with the electronic tag may be delivered to the re-inspection apparatus by a distribution apparatus.

In yet another aspect of the present disclosure, a non-transitory computer-readable storage medium is provided. The non-transitory computer-readable storage medium may include at least one set of instructions. When executed by at least one processor of a computing device, the at least one set of instructions may direct the at least one processor to perform acts of: receiving, by a monitoring platform, information relating to a suspect article in a package and information relating to an electronic tag attached to the package; generating, by the monitoring platform, re-inspection instructions for the package based on the information relating to the suspect article and the information relating to the electronic tag; sending, by the monitoring platform, the re-inspection instructions to a re-inspection apparatus; and re-inspecting, by the re-inspection apparatus, the suspect article in the package based on the re-inspection instructions. The information relating to the suspect article may be generated and sent by a security inspection machine. The information relating to the electronic tag may be generated and sent by a labelling apparatus. The package with the electronic tag may be delivered to the re-inspection apparatus by a distribution apparatus.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein.

DETAILED DESCRIPTION

Figure 1A:
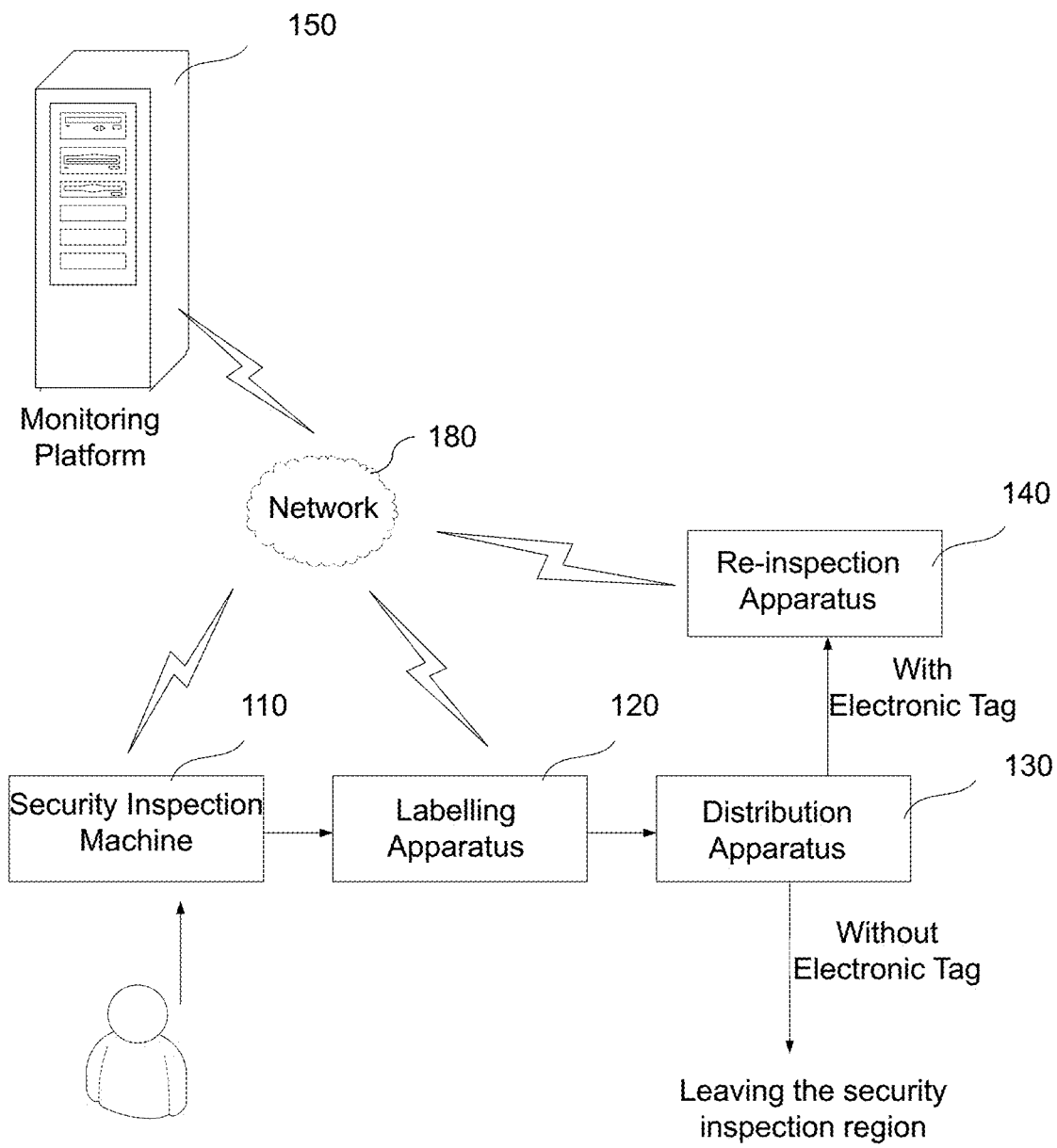
FIGS. 1A and 1B are schematic diagrams illustrating exemplary security inspection systems 100 according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or another storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

The present disclosure relates to a security inspection system. The system may include a re-inspection apparatus and a monitoring platform. The monitoring platform may receive information relating to a suspect article in a package and information relating to an electronic tag attached to the package. The information relating to the suspect article may be generated and sent by a security inspection machine. The information relating to the electronic tag may be generated and sent by a labelling apparatus. The monitoring platform may also generate re-inspection instructions for the package based on the information relating to the suspect article and the information relating to the electronic tag, and send the re-inspection instructions to the re-inspection apparatus. The package with the electronic tag may be delivered to the re-inspection apparatus by a distribution apparatus. The re-inspection apparatus may re-inspect the suspect article in the package based on the re-inspection instructions. Specifically, the re-inspection apparatus may identify the package based on the information relating to the electronic tag in the re-inspection instructions, and re-inspect the suspect article in the package based on the information relating to the suspect article in the re-inspection instructions.

Figure 1B:
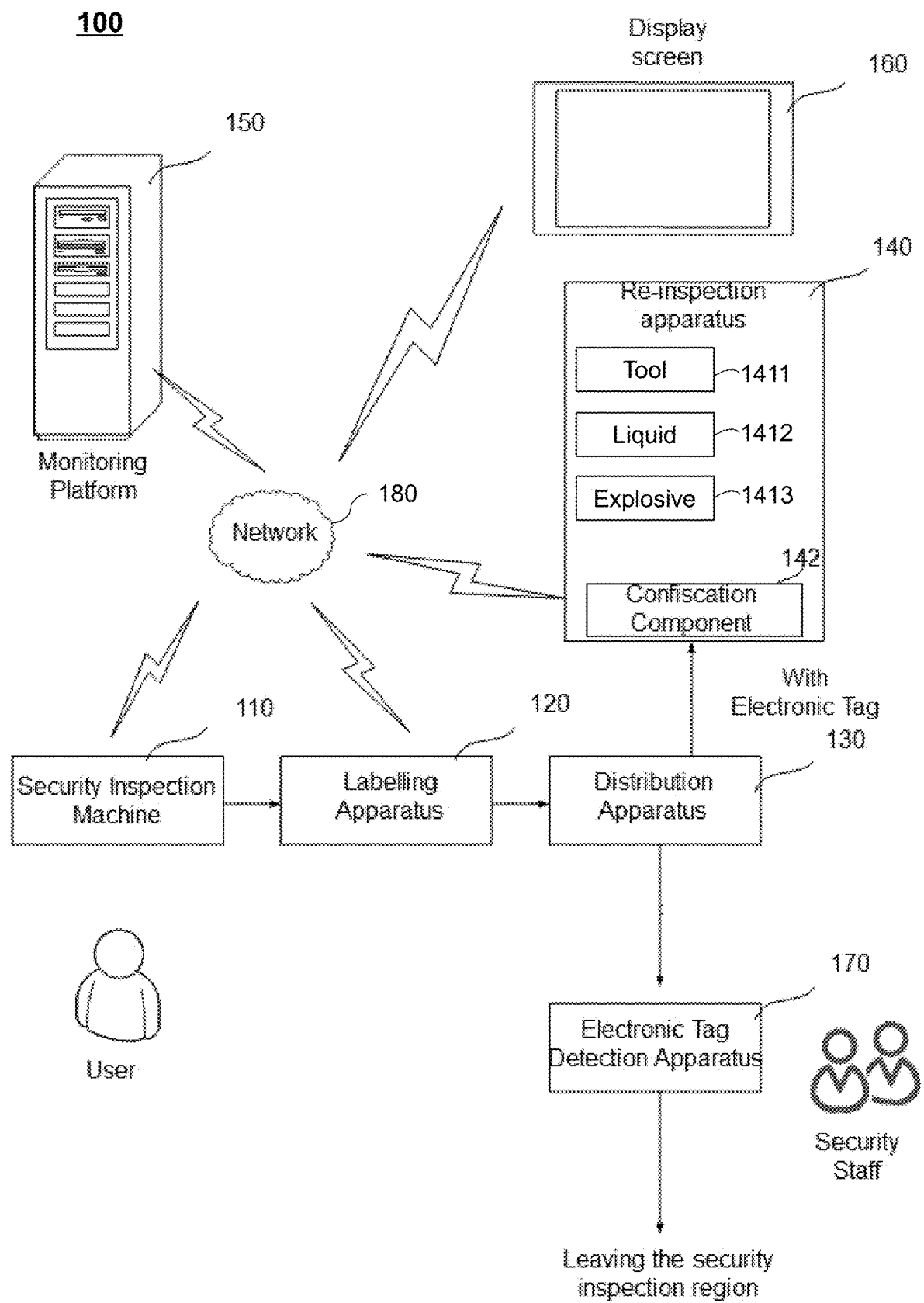

FIGS. 1A and 1B are schematic diagrams illustrating exemplary security inspection systems 100 according to some embodiments of the present disclosure. As shown in FIGS. 1A and 1B, the security inspection system 100 may include a security inspection machine 110, a labelling apparatus 120, a distribution apparatus 130, a re-inspection apparatus 140, and a monitoring platform 150.

In some embodiments, the security inspection machine 110 may include an X-ray security inspection apparatus, a trace explosive detector, a Raman spectrum security inspection apparatus, a metal detector, or the like, or any combination thereof. In some embodiments, the X-ray security inspection apparatus may include a single energy X-ray machine, a dual energy X-ray machine, a multi-view X-ray machine, a computed tomography (CT) security inspection machine, or the like, or any combination thereof. The security inspection machine 110 may be configured to perform an X-ray imaging on a package to be inspected and obtain an X-ray image (also referred to as a first image) of the package. The X-ray image may be a transmission image that can reflect one or more articles in the package. Different articles may have different penetration abilities for X-ray due to different densities thereof, and thus the articles in the package may be identified. In some embodiments, the security inspection machine 110 may determine whether a suspect article is in the package based on the X-ray image, e.g., using an image recognition technique. Exemplary image recognition technique may include a neural network-based image recognition technique, a wavelet moment-based image recognition technique, or the like. In some embodiments, if it is determined that no suspect article is in the package, the package may be delivered to a first conveying device (e.g., a conveyor belt), which will convey the package to a region from which a user takes his/her package away. Alternatively, if it is determined that a suspect article is in the package, the security inspection machine 110 may further identity information relating to the suspect article (e.g., the number of suspect articles, the type of each suspect article, the shape of each suspect article, or the like). The type of suspect articles may include suspect tool, suspect liquid, suspect explosive, suspect drug, suspect radioactive substances, or the like, or any combination thereof. The security inspection machine 110 may send labelling instructions to the labelling apparatus 120 and send the information relating to the suspect article to the monitoring platform 150.

The labelling apparatus 120 may be configured to attach an electronic tag for the package based on the labelling instructions. In some embodiments, the electronic tag may include a bar code, a two-dimensional code, a RFID, a specific pattern, or the like. The labelling apparatus 120 may send information relating to the electronic tag of the package to the monitoring platform 150.

The distribution apparatus 130 may be configured to deliver the package with the electronic tag to the re-inspection apparatus 140. If the package includes suspect articles, the distribution apparatus 130 may deliver the package to the re-inspection apparatus 140 for re-inspection. For example, the distribution apparatus 130 may deliver the package to a second conveying device (e.g., a conveyor belt) which is connected to the re-inspection apparatus 140. In some embodiments, the distribution apparatus 130 may be a mechanical arm, a push rod, or the like.

The monitoring platform 150 may be configured to generate re-inspection instructions based on the information relating to the electronic tag and the information relating to the suspect article. The monitoring platform 150 may send the re-inspection instructions to the re-inspection apparatus 140.

The re-inspection apparatus 140 may be configured to identify the package based on the information relating to the electronic tag in the re-inspection instructions. For example, the re-inspection apparatus 140 may identify the package by comparing the electronic tag of the package with the information relating to the electronic tag in the re-inspection instructions. The re-inspection apparatus 140 may further re-inspect the suspect article in the package based on the information relating to the suspect article in the re-inspection instructions. Specifically, after identifying the package, the re-inspection apparatus 140 may detect an article to be inspected in the package. In some embodiments, the article to be inspected may be, e.g., automatically by a mechanical arm or manually by a user (e.g., the owner of the package), taken out of the package and positioned on the re-inspection apparatus 140. The re-inspection apparatus 140 may generate a visible light image (also referred to as a fourth image) of the article to be re-inspected. The re-inspection apparatus 140 may compare the visible light image with the X-ray image of the suspect article in the re-inspection instructions. If it is determined that the article to be re-inspected is the suspect article in the package based on the comparison result, the re-inspection apparatus 140 may re-inspect the article according to the information relating to the suspect article in the re-inspection instructions. Alternatively, if it is determined that the article to be re-inspected is not the suspect article in the package based on the comparison result, the re-inspection apparatus 140 may output a prompt for repositioning the suspect article. It should be noted that the above descriptions of the identification of the suspect article are merely an example, and are not intended to limit the scope of the present disclosure. In some embodiments, the re-inspection apparatus 140 may identify the suspect article using other techniques.

In some embodiments, the re-inspection apparatus 140 may include a plurality of re-inspection components, each of which may correspond to a type of suspect articles. For example, the re-inspection components may include a tool re-inspection component (briefly marked as "tool" in FIG. 1B) 1411, a liquid re-inspection component (briefly marked as "liquid" in FIG. 1B) 1412, an explosive re-inspection component (briefly marked as "explosive" in FIG. 1B) 1413, or the like. The tool re-inspection component may be used to detect suspect tools using a metal detection technique. The liquid re-inspection component may be used to detect suspect liquids using a laser Raman technique, a dielectric constant measurement technique, or the like. The explosive re-inspection component may be used to detect suspect explosives using a neutron detection technique, a particle migration technique, a nuclear quadrupole resonance (NQR), or the like. The monitoring platform 150 may determine a re-inspection component corresponding to the suspect article (also referred to as a target re-inspection component) among the plurality of re-inspection components. Then the suspect article may be disposed on the target re-inspection component for re-inspection. If there are a plurality of suspect articles, the monitoring platform 150 may determine the corresponding re-inspection component for each suspect article. The plurality of suspect articles may be re-inspected by its corresponding re-inspection components. In some embodiments, the re-inspection apparatus 140 may send a re-inspection result to the monitoring platform 150 for storage. In some embodiments, the re-inspection apparatus 140 may also include a confiscation component 142. The confiscation component 142 may be configured to confiscate the suspect article if the suspect article is determined as a contraband based on the re-inspection result. Merely by way of example, the confiscation component 142 may include a mechanical arm, a driving motor, and a recycle bin. If the suspect article is determined as a contraband, the mechanical arm may be actuated by the driving motor to put the contraband into the recycle bin. In some embodiments, in order to avoid the user to take away the contraband, the re-inspection apparatus 140 may fix the contraband before the confiscation component 142 confiscates the contraband. It should be noted that the confiscation component 142 may have other structures as long as the confiscation component 142 can confiscate the contraband.

In some embodiments, the re-inspection of the suspect article may be completed with the assistance of a user. As shown in FIG. 1B, in order to facilitate the user to assist the re-inspection, the security inspection system 100 may include a display screen 160. The display screen 160 may be configured to display information relating to the package. In some embodiments, the security inspection machine 110 may acquire an appearance image (also referred to as a second image) of the package by photographing the package. In some embodiments, the security inspection machine 110 may send the appearance image and the X-ray image of the package to the monitoring platform 150. The monitoring platform 150 may send the appearance image, the X-ray image, and/or the information relating to the suspect article to the display screen 160 for display. In some embodiments, the monitoring platform 150 may perform an image matting for the suspect article in the X-ray image to obtain a processed X-ray image, and send the processed X-ray image to the display screen for display. Alternatively, the security inspection machine 110 may directly send the appearance image, the X-ray image, and/or the information relating to the suspect article to the display screen 160 for display. Thus, the user can easily know which article in the package is a suspect article, thus facilitating the user to place the suspect article on the re-inspection apparatus 140. In some embodiments, the monitoring platform 150 may also obtain an appearance image (also referred to as a third image) of the target re-inspection component which is captured by the re-inspection apparatus 140. The monitoring platform 150 may send the appearance image of the target re-inspection component to the display screen 160 for display. Alternatively, the re-inspection apparatus 140 may directly send the appearance image of the target re-inspection component to the display screen 160. The display screen 160 may display the appearance image of the re-inspection component corresponding to the suspect article (i.e., the target re-inspection component). Thus, the user can easily choose the target re-inspection component to re-inspecting the suspect article. In some embodiments, the monitoring platform 150 may determine a display mode of the information relating to the suspect article and/or the appearance image of the target re-inspection component. In some embodiments, the display mode may be used to highlight the information relating to the suspect article and the appearance image of the target re-inspection component. The display screen 160 may display the information relating to the suspect article and the appearance image of the target re-inspection component according to the display mode. In some embodiments, the display screen 160 may be positioned according to actual conditions, as long as it can be easily viewed by the user.

Figure 2:
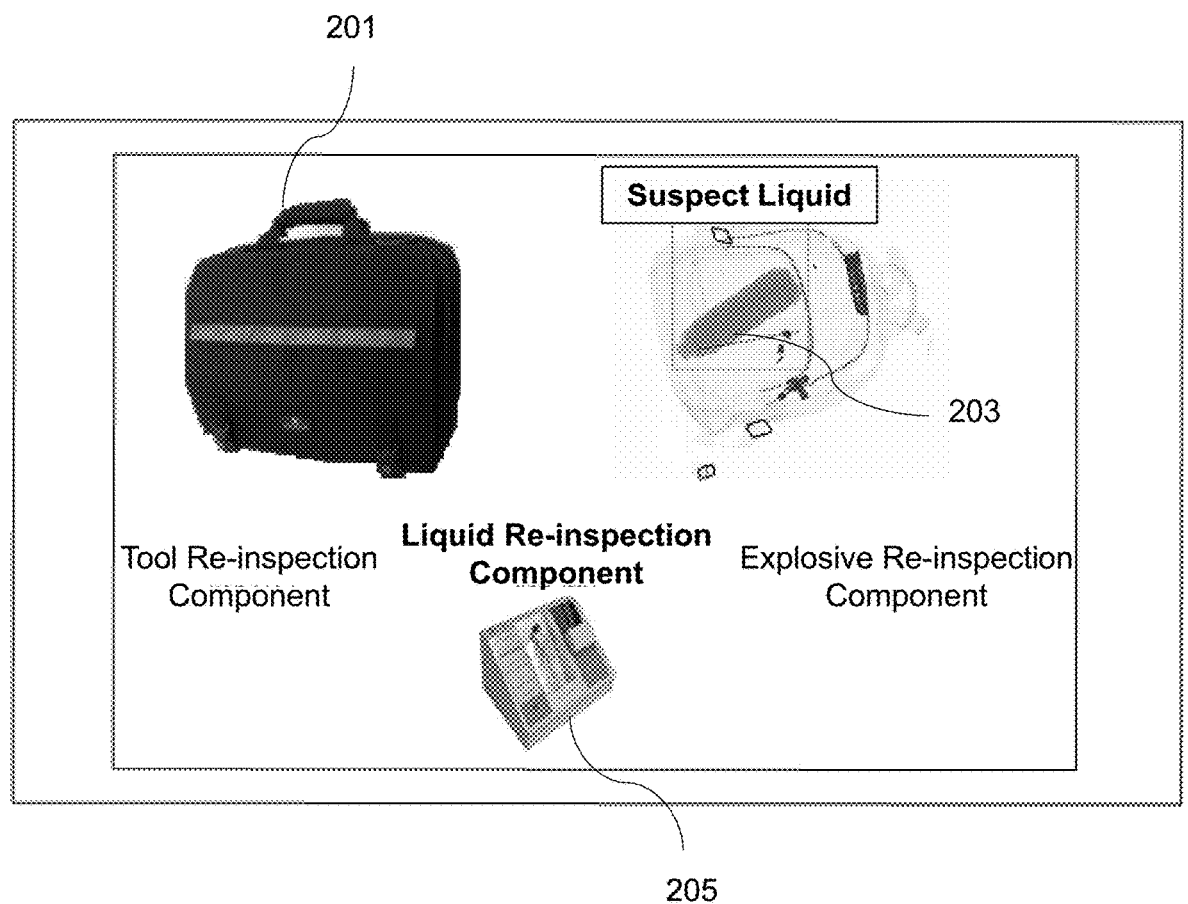
FIG. 2 is a schematic diagram illustrating an exemplary display screen according to some embodiments of the present disclosure.

Merely by way of example, FIG. 2 is a schematic diagram illustrating an exemplary display screen 200 according to some embodiments of the present disclosure. As shown in FIG. 2, the display screen 200 displays an appearance image of the package 201, an X-ray image of a suspect article 203 in the package, and an appearance image of a re-inspection component 205 corresponding to the suspect article. According to the appearance image of the package 201, the user can easily recognize his/her package. According to the X-ray image of the suspect article 203, the user can easily recognize the article to be re-inspected. As shown in FIG. 2, the "suspect liquid" should be re-inspected. According to the appearance image of the re-inspection component 205, the user can easily recognize the target re-inspection component. Herein, the target re-inspection component is the liquid re-inspection component used to inspect the suspect liquid. As shown in FIG. 2, the "suspect liquid" are shaded to highlight the suspect article. The "liquid re-inspection component" are strengthened to highlight the target re-inspection component.

In some embodiments, there may be one or more suspect articles in the package. Thus, it is required to ensure that all suspect articles have been re-inspected. In some embodiments, the monitoring platform 150 may store a correspondence of the information relating to the electronic tag and the information relating to the suspect article. In some embodiments, the correspondence may be represented by an association table (e.g., Table 1). In some embodiments, an electronic tag of a package may correspond to one or more suspect articles in the package. The monitoring platform 150 may set a security status of the electronic tag of the package as pending. That is, the security status of the suspect articles in the package may be set as pending. When a suspect article is re-inspected, the monitoring platform 150 may receive the re-inspection result sent by the re-inspection apparatus 140, and determine the security status of the suspect article as inspected. The monitoring platform 150 may determine whether all suspect articles in the package have been re-inspected based on the re-inspection result and the stored correspondence. If one or more suspect articles are not re-inspected, the monitoring platform 150 may determine the one or more suspect articles in the package, and send second re-inspection instructions for the one or more suspect articles to the re-inspection apparatus 140. Alternatively, if all the suspect articles in the package have been re-inspected, the monitoring platform 150 may update the security status of the electronic tag as inspected according to the re-inspection result. Merely by way of example, Table 1 shows exemplary correspondences of electronic tags of packages and suspect articles in the packages. As shown in Table 1, there are two electronic tags (electronic tag 1, electronic tag 2), which corresponds to two package (package 1, package 2), respectively. The package 1 may include two suspect articles (suspect article A, suspect article B). As shown in Table 1, the suspect article B has been re-inspected (i.e., the security status of which being inspected) and is determined as a contraband, which may be confiscated by the confiscation component 142. The suspect article A has not been re-inspected (i.e., the security status of which being pending). The monitoring platform 150 may send second re-inspection instructions to the re-inspection apparatus 140 to re-inspect the suspect article A. In this case, the security status of the electronic tag 1 may remain pending. The package 2 may include only one suspect article (suspect article A') whose security status is inspected. In this case, the security status of the electronic tag 2 may be updated as inspected.

TABLE 1

| Electronic Tag | Suspect Articles | Security Status of Suspect Articles | Re-inspection Result | Security Status of Electronic Tags |
|---|---|---|---|---|
| Electronic Tag 1 | Suspect Article A | Pending | | Pending |
| | Suspect Article B | Inspected | Contraband | |
| Electronic Tag 2 | Suspect Article A' | Inspected | | Inspected |

In some embodiments, as shown in FIG. 1B, the security inspection system 100 may also include an electronic tag detection apparatus 170. The electronic tag detection apparatus 170 may be configured to detect the electronic tag of the package that leaves the security inspection region. If the electronic tag is detected, the electronic tag detection apparatus 170 may send the information relating to the electronic tag to the monitoring platform 150. The monitoring platform 150 may determine the security status of the electronic tag. If the security status of the electronic tag is pending, the monitoring platform 150 may send alarm instructions to the electronic tag detection apparatus 170. The electronic tag detection apparatus 170 may output alarm information based on the alarm instructions. The alarm information may be used to remind a security staff that one or more suspect articles in the package have not been re-inspected. Alternatively, if the security status of the electronic tag is inspected, the monitoring platform 150 may not send the alarm instructions to the electronic tag detection apparatus 170. Then the package may leave the security inspection region.

In some embodiments, the security inspection system 100 may include a network 180 configured to facilitate the communication of information and/or data. In some embodiments, one or more components of the security inspection system 100 (e.g., the security inspection machine 110, the labelling apparatus 120, the distribution apparatus 130, the re-inspection apparatus 140, the monitoring platform 150, the display screen 160, or the electronic tag detection apparatus 170) may send information and/or data to another component(s) in the security inspection system 100 via the network 180. For example, the security inspection machine 110 may send the information relating to the suspect to the monitoring platform 150 via the network 180. As another example, the monitoring platform 150 may send the re-inspection instructions to the re-inspection apparatus 140 via the network 180. In some embodiments, the network 180 may be any type of wired or wireless network, or combination thereof. Merely by way of example, the network 180 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, or the like, or any combination thereof.

In some embodiments, the security inspection system 100 may include a storage device (not shown in FIGS. 1A and 1B) configured to store data and/or instructions. In some embodiments, the storage device may store data or information generated by one or more components of the security inspection system 100 (e.g., the security inspection machine 110, the labelling apparatus 120, the distribution apparatus 130, the re-inspection apparatus 140, the monitoring platform 150, the display screen 160, or the electronic tag detection apparatus 170). In some embodiments, the storage device may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

Figure 3:
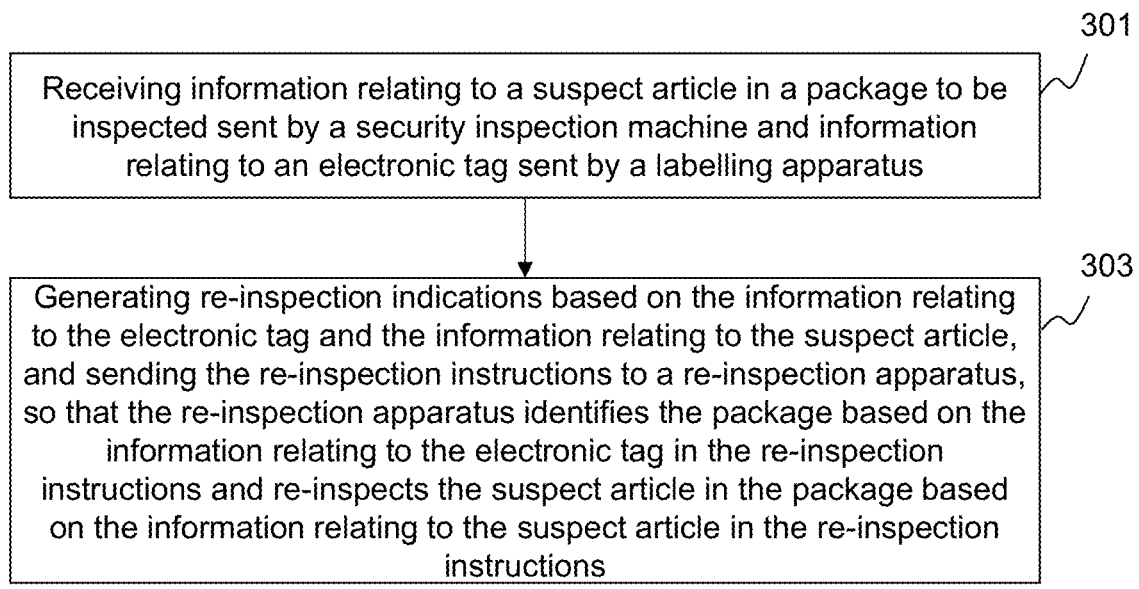
FIG. 3 is a flowchart illustrating an exemplary process for security inspection according to some embodiments of the present disclosure.

FIG. 3 is a flowchart illustrating an exemplary process 300 for security inspection according to some embodiments of the present disclosure. In some embodiments, the processor 1110 may be described as a subject to perform the process 300. However, one of ordinary skill in the art would understand that the process 300 may also be performed by other entities. In some embodiments, one or more operations in the process 300 may be stored in a storage device (e.g., the storage device in the security inspection system 100, the RAM 1121, the cache memory 1122, the ROM 1123, etc.) in the form of instructions, and invoked and/or executed by the processor 1110. In some embodiments, the instructions may be transmitted in the form of electronic current or electrical signals. In some embodiments, the process 300 may be implemented by the monitoring platform 150 of the security inspection system 100.

In 301, the processor 1110 (e.g., the first receiving module 801) may receive information relating to a suspect article in a package to be inspected sent by a security inspection machine (e.g., the security inspection machine 110) and information relating to an electronic tag sent by a labelling apparatus (e.g., the labelling apparatus 120).

In 303, the processor 1110 (e.g., the first sending module 803) may generate re-inspection instructions based on the information relating to the suspect article and the information relating to the electronic tag. The processor 1110 (e.g., the first sending module 803) may send the re-inspection instructions to a re-inspection apparatus (e.g., the re-inspection apparatus 140) so that the re-inspection apparatus identifies the package based on the information relating to the electronic tag in the re-inspection instructions and re-inspects the suspect article in the package based on the information relating to the suspect article in the re-inspection instructions.

In some embodiments, in order to facilitate a user to perform the re-inspection, the processor 1110 may receive an appearance image and an X-ray image of the package sent by the security inspection machine (e.g., the security inspection machine 110). The processor 1110 may further send the appearance image and the X-ray image of the package to a display screen (e.g., the display screen 160) for display. Thus, the user may identify the article to be inspected in his/her package through the display screen (e.g., the display screen 160), thus completing the re-inspection with the assistance of the user.

In some embodiments, the processor 1110 may perform an image matting for the suspect article in the X-ray image to obtain a processed X-ray image, and send the processed X-ray image to the display screen (e.g., the display screen 160) for display. Thus, the user may easily identify the article to be inspected in his/her package according to the processed X-ray image.

In some embodiments, the processor 1110 may determine a re-inspection component corresponding to the suspect article (also referred to as a target re-inspection component). The processor 1110 may obtain an appearance image of the target re-inspection component, and send the appearance image of the target re-inspection component to the display screen (e.g., the display screen 160) for display. Thus, the user may find the target re-inspection component based on the appearance image.

In some embodiments, the processor 1110 may determine a display mode of the information relating to the suspect article and the appearance image of the re-inspection component corresponding to the suspect article. The display mode may be used to highlight the information relating to the suspect article and the appearance image of the re-inspection component corresponding to the suspect article, so that the display screen displays the information relating to the suspect article and the appearance image of the re-inspection component corresponding to the suspect article according to the display mode.

Figure 4:
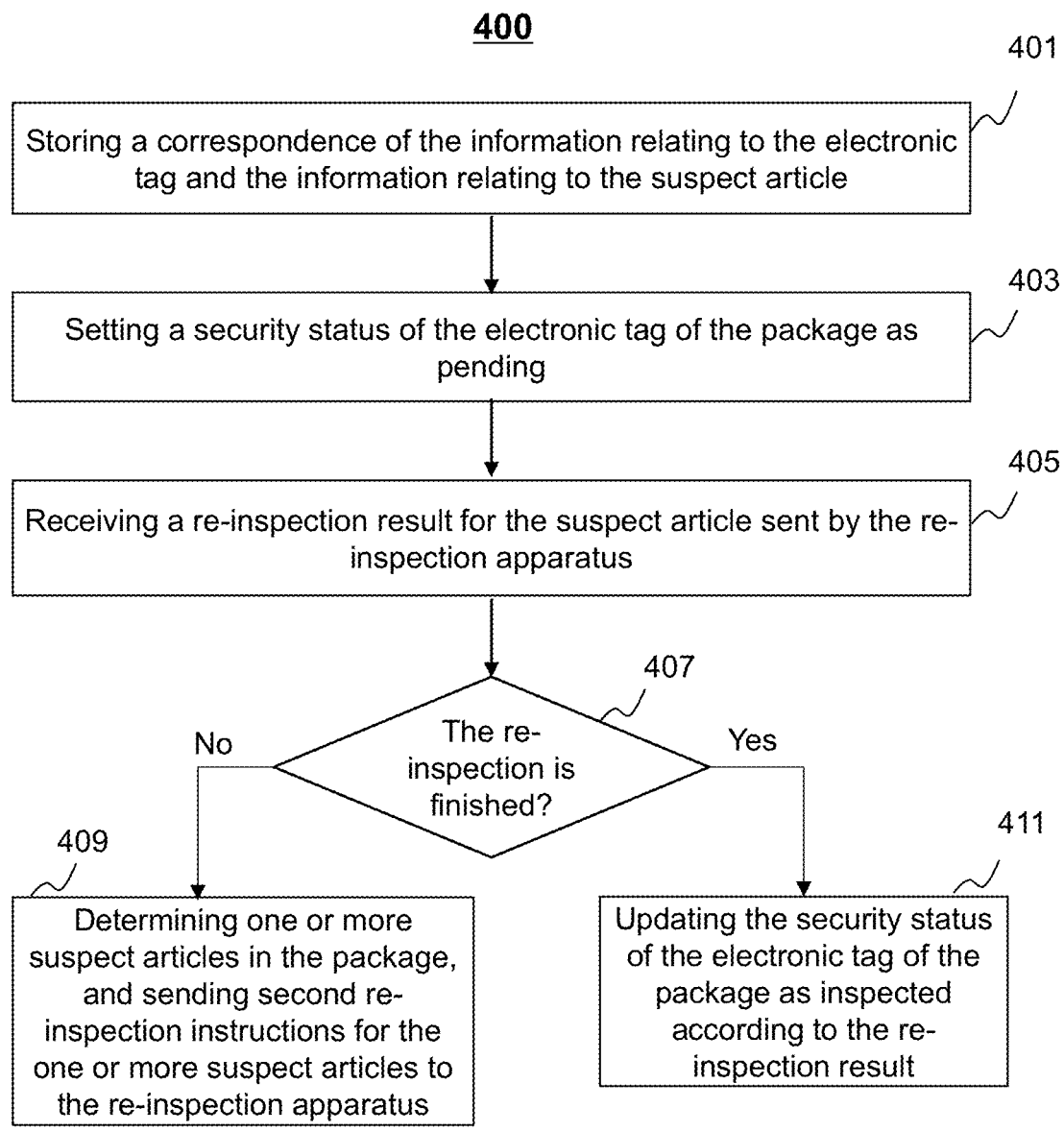
FIG. 4 is a flowchart illustrating an exemplary process for determining whether all suspect articles in a package have been re-inspected according to some embodiments of the present disclosure.

In some embodiments, there may be one or more suspect articles in the package. Thus, it is necessary to ensure that all suspect articles in the package are re-inspected. Merely by way of example, FIG. 4 is a flowchart illustrating an exemplary process 400 for determining whether all suspect articles in a package have been re-inspected according to some embodiments of the present disclosure. In some embodiments, the processor 1110 may be described as a subject to perform the process 400. However, one of ordinary skill in the art would understand that the process 400 may also be performed by other entities. In some embodiments, one or more operations in the process 400 may be stored in a storage device (e.g., the storage device in the security inspection system 100, the RAM 1121, the cache memory 1122, the ROM 1123, etc.) in the form of instructions, and invoked and/or executed by the processor 1110. In some embodiments, the instructions may be transmitted in the form of electronic current or electrical signals. In some embodiments, the process 400 may be performed by the monitoring platform 150 of the security inspection system 100.

In 401, the processor 1110 may store a correspondence of the information relating to the electronic tag and the information relating to the suspect article. In some embodiments, the correspondence may be represented by an association table. The electronic tag may be used to determine the corresponding package including one or more suspect articles. In some embodiments, an electronic tag of a package may correspond to one or more suspect articles in the package.

In 403, the processor 1110 may set a security status of the electronic tag of the package as pending.

In 405, the processor 1110 may receive a re-inspection result for the suspect article sent by the re-inspection apparatus (e.g., the re-inspection apparatus 140).

In 407, the processor 1110 may determine whether the re-inspection is finished. In some embodiments, the processor 1110 may determine whether all suspect articles in the package have been re-inspected based on the re-inspection result and the stored correspondence. In response to a determination that the re-inspection is not finished, the processor 1110 may proceed to operation 409. Alternatively, in response to a determination that the re-inspection is finished, the processor 1110 may proceed to operation 411.

In 409, the processor 1110 may determine one or more suspect articles in the package, and send second re-inspection instructions for the one or more suspect articles to the re-inspection apparatus (e.g., the re-inspection apparatus 140).

In 411, the processor 1110 may update the security status of the electronic tag according to the re-inspection result.

In some embodiments, the package that leaves the security inspection region may be detected by an electronic tag detection apparatus (e.g., the electronic tag detection apparatus 170) to verify whether all suspect articles in the package have been re-inspected. In some embodiments, the processor 1110 may receive the information relating to the electronic tag detected by the electronic tag detection apparatus, and determine the security status of the electronic tag sent by the electronic tag detection apparatus. If the security status of the electronic tag is pending, the processor 1110 may send alarm instructions to the electronic tag detection apparatus so that the electronic tag detection apparatus outputs alarm information based on the alarm instructions. The alarm information may be used to inform a security staff that one or more suspect articles in the package have not been re-inspected. Then the package may be checked by the security staff.

In the present disclosure, the processor 1110 (i.e., the monitoring platform 150) can control other components (e.g., the re-inspection apparatus 140) of the security inspection system 100 to perform the security inspection, and may guide the user to assist the re-inspection of the suspect article(s) in his/her package, thereby saving the labor cost and improving the efficiency of security inspection.

Figure 5:
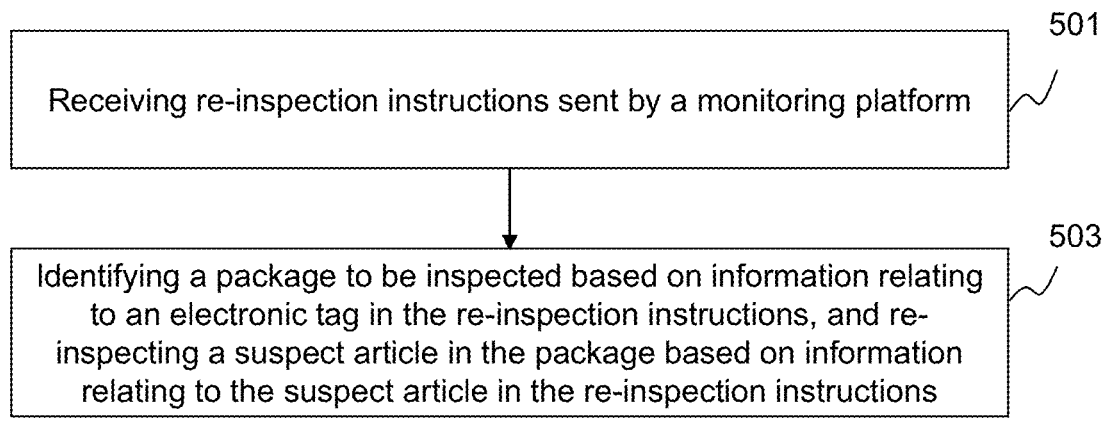
FIG. 5 is a flowchart illustrating an exemplary process for security inspection according to some embodiments of the present disclosure.

FIG. 5 is a flowchart illustrating an exemplary process 500 for security inspection according to some embodiments of the present disclosure. In some embodiments, the processor 1110 may be described as a subject to perform the process 500. However, one of ordinary skill in the art would understand that the process 500 may also be performed by other entities. In some embodiments, one or more operations in the process 500 may be stored in a storage device (e.g., the storage device in the security inspection system 100, the RAM 1121, the cache memory 1122, the ROM 1123, etc.) in the form of instructions, and invoked and/or executed by the processor 1110. In some embodiments, the instructions may be transmitted in the form of electronic current or electrical signals. In some embodiments, the process 500 may be performed by the re-inspection apparatus 140 of the security inspection system 100.

In 501, the processor 1110 (e.g., the re-inspection instruction receiving module 901) may receive re-inspection instructions sent by a monitoring platform (e.g., the monitoring platform 150).

In 503, the processor 1110 (e.g., the re-inspection module 903) may identify a package to be inspected based on information relating to an electronic tag in the re-inspection instructions, and re-inspect a suspect article in the package based on information relating to the suspect article in the re-inspection instructions.

In the present disclosure, the re-inspection for the suspect article may be implemented by the re-inspection apparatus 140 based on the re-inspection instructions, which may improve the efficiency of security inspection.

Figure 6:
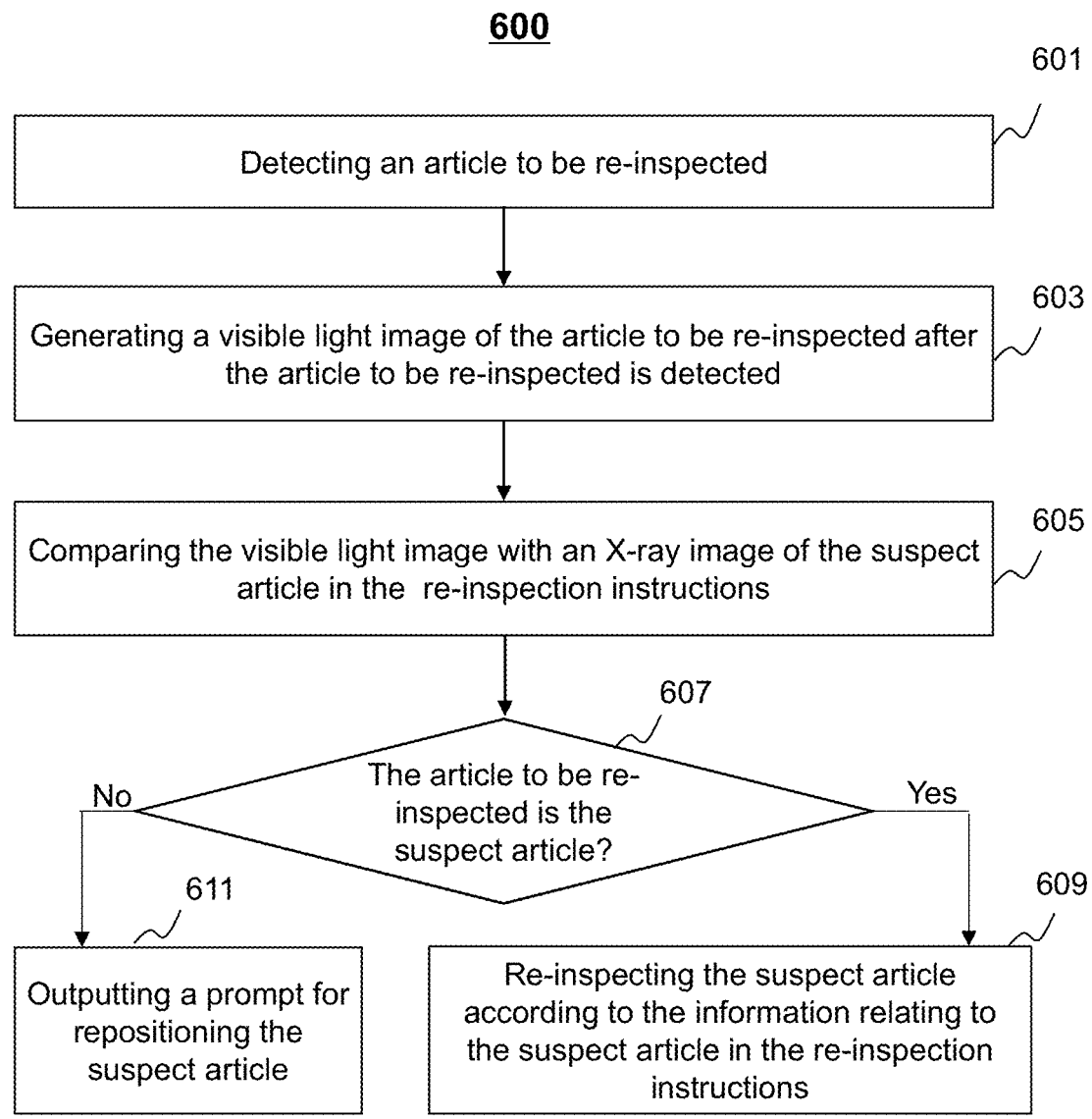
FIG. 6 is a flowchart illustrating an exemplary process for identify a suspect article according to some embodiments of the present disclosure.

In some embodiments, after identifying the package, the processor 1110 may determine whether an article to be re-inspected is the suspect article. Merely by way of example, FIG. 6 is a flowchart illustrating an exemplary process 600 for identifying the suspect article according to some embodiments of the present disclosure. In some embodiments, the processor 1110 may be described as a subject to perform the process 600. However, one of ordinary skill in the art would understand that the process 600 may also be performed by other entities. In some embodiments, one or more operations in the process 600 may be stored in a storage device (e.g., the storage device in the security inspection system 100, the RAM 1121, the cache memory 1122, the ROM 1123, etc.) in the form of instructions, and invoked and/or executed by the processor 1110. In some embodiments, the instructions may be transmitted in the form of electronic current or electrical signals. In some embodiments, the process 600 may be performed by the re-inspection apparatus 140 of the security inspection system 100.

In 601, the processor 1110 may detect an article to be re-inspected.

In 603, the processor 1110 may generate a visible light image of the article to be re-inspected by photographing the article to be re-inspected.

In 605, the processor 1110 may compare the visible light image with an X-ray image of the suspect article in the re-inspection instructions. In some embodiments, the processor 1110 may send the visible light image to the monitoring platform (e.g., the monitoring platform 150). The monitoring platform may compare the visible light image and the processed X-ray image (i.e., the X-ray image after image matting) of the suspect article to determine whether the article to be re-inspected is the suspect article.

In 607, the processor 1110 may determine whether the article to be re-inspected is the suspect article based on the comparison result.

If it is determined that the article to be re-inspected is the suspect article in the package, the processor 1110 may proceed to operation 609. In 609, the processor 1110 may re-inspect the suspect article according to the information relating to the suspect article in the re-inspection instructions.

Alternatively, if it is determined that the article to be re-inspected is not the suspect article in the package, the processor 1110 may proceed to operation 611. In 611, the processor 1110 may output a prompt for repositioning the suspect article.

In some embodiments, if the suspect article is determined as a contraband based on the re-inspection result, the processor 1110 may confiscate the suspect article.

In the present disclosure, whether an article to be re-inspected is the suspect article may be determined. Once the article to be re-inspected is not the suspect article, a prompt may be outputted to remind the user to reposition the suspect article, thus guiding the user to assist the re-inspection.

Figure 7:
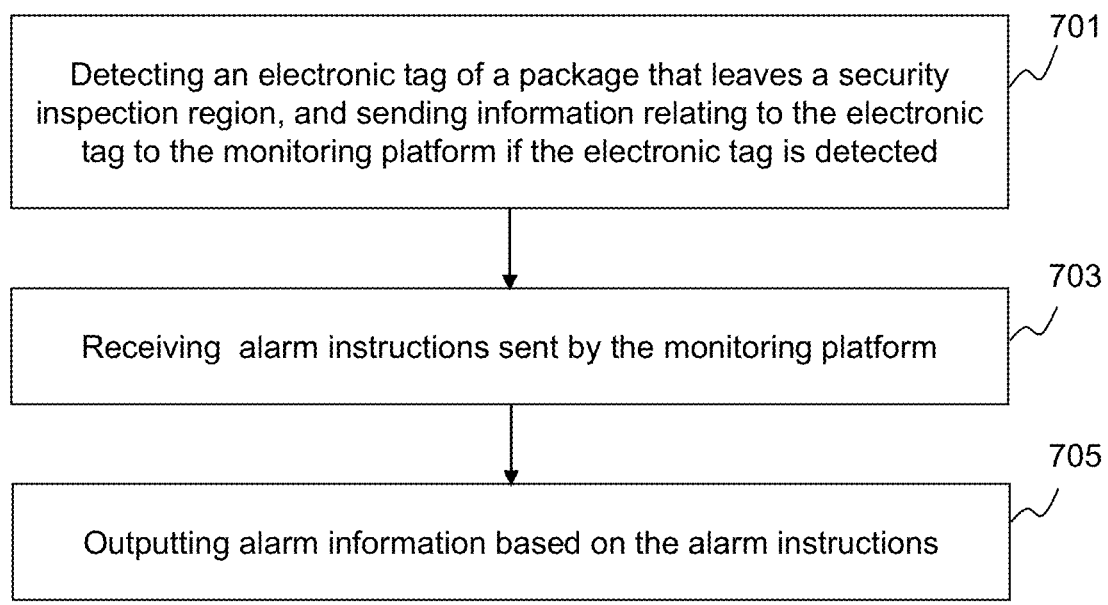
FIG. 7 is a flowchart illustrating an exemplary process for security inspection according to some embodiments of the present disclosure.

FIG. 7 is a flowchart illustrating an exemplary process 700 for security inspection according to some embodiments of the present disclosure. In some embodiments, the processor 1110 may be described as a subject to perform the process 700. However, one of ordinary skill in the art would understand that the process 700 may also be performed by other entities. In some embodiments, one or more operations in the process 700 may be stored in a storage device (e.g., the storage device in the security inspection system 100, the RAM 1121, the cache memory 1122, the ROM 1123, etc.) in the form of instructions, and invoked and/or executed by the processor 1110. In some embodiments, the instructions may be transmitted in the form of electronic current or electrical signals. In some embodiments, the process 700 may be performed by the electronic tag detection apparatus 170 of the security inspection system 100.

In 701, the processor 1110 (e.g., the electronic tag detection module 1001) may detect an electronic tag of a package that leaves a security inspection region. If the electronic tag is detected, the processor 1110 may send information relating to the electronic tag to a monitoring platform (e.g., the monitoring platform 150).

In 703, the processor 1110 (e.g., the security status receiving module 1003) may receive alarm instructions sent by the monitoring platform.

In 705, the processor 1110 (e.g., the alarm module 1005) may output alarm information based on the alarm instructions.

In the present disclosure, the processor 1110 (i.e., the electronic tag detection apparatus) may detect the electronic tag of the package that leaves the security inspection region, which can ensure that all suspect articles in the package have been re-inspected.

Figure 8:
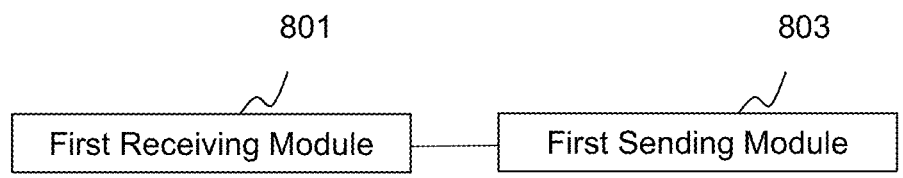
FIG. 8 is a block diagram illustrating an exemplary security inspection device according to some embodiments of the present disclosure.

FIG. 8 is a block diagram illustrating an exemplary security inspection device 800 according to some embodiments of the present disclosure. The security inspection device 800 may include a first receiving module 801 and a first sending module 803. The modules may be hardware circuits of all or part of the processor 1110. The modules may also be implemented as an application or a set of instructions read and executed by the processor 1110. Further, the modules may be any combination of the hardware circuits and the application/instructions. For example, the modules may be the part of the processor 1110 when the processor 1110 is executing the application/set of instructions.

The first receiving module 801 may be configured to receive information relating to a suspect article in the package to be inspected sent by a security inspection machine and information relating to an electronic tag sent by a labelling apparatus.

The first sending module 803 may be configured to generate re-inspection instructions based on the information relating to the electronic tag and the information relating to the suspect article. The first sending module 803 may send the re-inspection instructions to a re-inspection apparatus so that the re-inspection apparatus identifies the package based on the information relating to the electronic tag in the re-inspection instructions and re-inspects the suspect article in the package based on the information relating to the suspect article in the re-inspection instructions.

In some embodiments, the security inspection device 800 may further include a second receiving module and a second sending module. The second receiving module may be configured to receive an appearance image and an X-ray image of the package sent by the security inspection machine. The second sending module may be configured to send the appearance image and the X-ray image of the package to a display screen for display. The second sending module may also be configured to perform an image matting for the suspect article in the X-ray image to obtain a processed X-ray image, and send the processed X-ray image to the display screen.

In some embodiments, the security inspection device 800 may further include a third sending module. The third sending module may be configured to determine a re-inspection component corresponding to the suspect article. The third sending module may also be configured to obtain an appearance image of the re-inspection component, and send the appearance image of the re-inspection component to the display screen for display.

In some embodiments, the security inspection device 800 may include a display mode determination module. The display mode determination module may be configured to determine a display mode of the information relating to the suspect article and the appearance image of the re-inspection component corresponding to the suspect article. The display mode may be used to highlight the information relating to the suspect article and the appearance image of the re-inspection component corresponding to the suspect article, so that the display screen displays the information relating to the suspect article and the appearance image of the re-inspection component corresponding to the suspect article according to the display mode.

In some embodiments, the security inspection device 800 may further include a storage module, a first security status determination module, a third receiving module, a re-inspection determination module, a fourth sending module, and a second security status determination module. The storage module may be configured to store a correspondence of the information relating to the electronic tag and the information relating to the suspect article. The first security status determination module may be configured to set a security status of the electronic tag as pending. The third receiving module may be configured to receive a re-inspection result for the suspect article sent by the re-inspection apparatus. The re-inspection determination module may be configured to determine whether all suspect articles in the package have been re-inspected based on the re-inspection result and the stored correspondence. The fourth sending module may be configured to, if one or more suspect articles are not re-inspected, determine the one or more suspect articles in the package, and send second re-inspection instructions for the one or more suspect articles to the re-inspection apparatus. The second security status determination module may be configured to, if all the suspect articles in the package have been re-inspected, update the security status of the electronic tag as inspected according to the re-inspection result.

In some embodiments, the security inspection device 800 may further include a fourth receiving module, a determination module, and a fifth sending module. The fourth receiving module may be configured to receive the information relating to the electronic tag detected by an electronic tag detection apparatus. The determination module may be configured to determine the security status of the electronic tag sent by the electronic tag detection apparatus. The fifth sending module may be configured to, if the security status of the electronic tag is pending, send alarm instructions to the electronic tag detection apparatus, so that the electronic tag detection apparatus outputs alarm information based on the alarm instructions.

Figure 9:
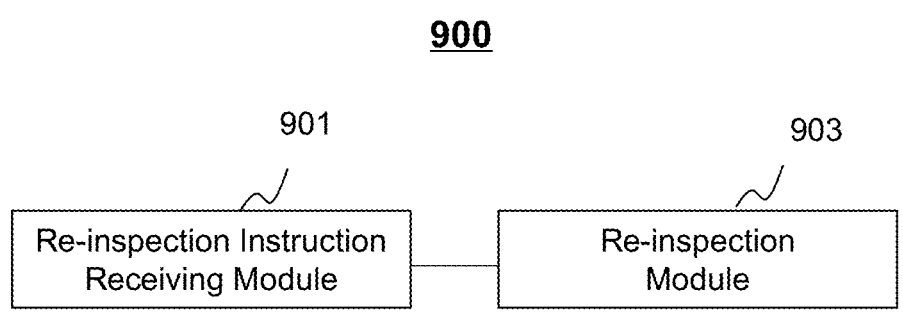
FIG. 9 is a block diagram illustrating an exemplary security inspection device according to some embodiments of the present disclosure.

FIG. 9 is a block diagram illustrating an exemplary security inspection device 900 according to some embodiments of the present disclosure. The security inspection device 900 may include a re-inspection instruction receiving module 901 and a re-inspection module 903. The modules may be hardware circuits of all or part of the processor 1110. The modules may also be implemented as an application or a set of instructions read and executed by the processor 1110. Further, the modules may be any combination of the hardware circuits and the application/instructions. For example, the modules may be the part of the processor 1110 when the processor 1110 is executing the application/set of instructions.

The re-inspection instruction receiving module 901 may be configured to receive re-inspection instructions sent by a monitoring platform.

The re-inspection module 903 may be configured to identify a package to be inspected based on information relating to an electronic tag in the re-inspection instructions. The re-inspection module 903 may be configured to re-inspect a suspect article in the package based on information relating to the suspect article in the re-inspection instructions.

In some embodiments, the security inspection device 900 may further include a detection module, a visible light image determination module, and a comparison module. The detection module may be configured to detect an article to be re-inspected after the re-inspection module identifies the package based on the information relating to the electronic tag in the re-inspection instructions. The visible light image determination module may be configured to generate a visible light image of the article to be re-inspected after the article to be re-inspected is detected. The comparison module may be configured to compare the visible light image with an X-ray image of the suspect article in the re-inspection instructions. The re-inspection module configured to, if it is determined that the article to be re-inspected is the suspect article in the package based on the comparison result, re-inspect the article according to the information relating to the suspect article in the re-inspection instructions.

In some embodiments, the security inspection device 900 may further include a prompt module. The prompt module may be configured to, if it is determined that the article to be re-inspected is not the suspect article in the package based on the comparison result, output a prompt for repositioning the suspect article.

In some embodiments, the security inspection device 900 may further include a confiscation module. The confiscation module may be configured to confiscate the suspect article if the suspect article is determined as a contraband based on a re-inspection result.

Figure 10:
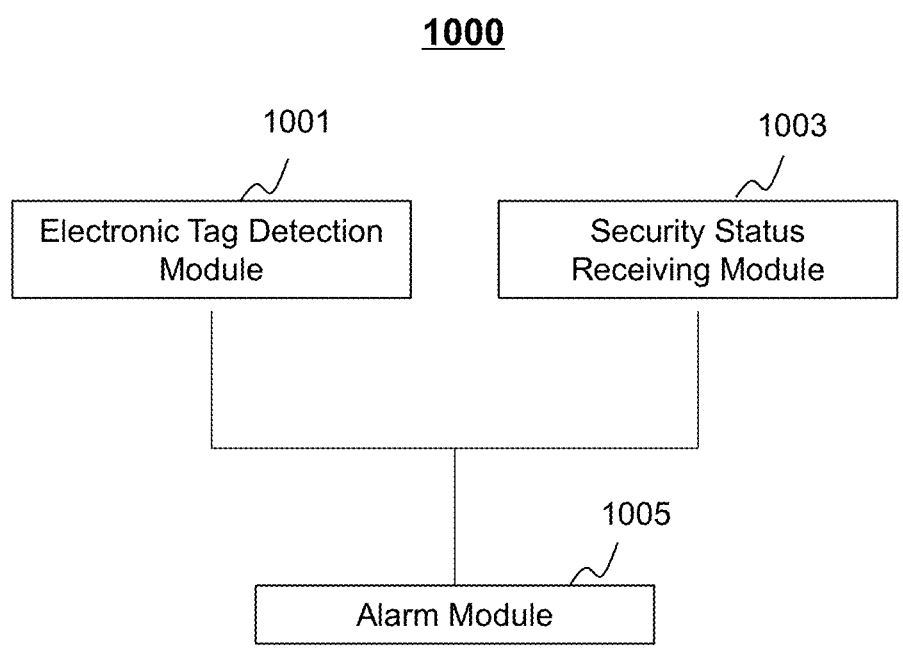
FIG. 10 is a block diagram illustrating an exemplary security inspection device according to some embodiments of the present disclosure.

FIG. 10 is a block diagram illustrating an exemplary security inspection device 900 according to some embodiments of the present disclosure. The security inspection device 1000 may include an electronic tag detection module 1001, a security status receiving module 1003, and an alarm module 1005. The modules may be hardware circuits of all or part of the processor 1110. The modules may also be implemented as an application or a set of instructions read and executed by the processor 1110. Further, the modules may be any combination of the hardware circuits and the application/instructions. For example, the modules may be the part of the processor 1110 when the processor 1110 is executing the application/set of instructions.

The electronic tag detection module 1001 may be configured to detect an electronic tag of a package that leaves a security inspection region. If the electronic tag is detected, the electronic tag detection module 1001 may send information relating to the electronic tag to a monitoring platform.

The security status receiving module 1003 may be configured to receive alarm instructions sent by the monitoring platform.

The alarm module 1005 may be configured to output alarm information based on the alarm instructions.

Those skilled in the art will appreciate that various aspects of the present disclosure may be implemented as systems, methods, or program products. Therefore, various aspects of the present disclosure may be implemented in the form of a complete hardware implementation, a complete software implementation (e.g., firmware, microcode, etc.), a combination of hardware and software implementations, which may be referred to as "circuit," "module," or "system."

The present disclosure also provides a computing device. The computing device may include at least one processor, and at least one storage device. The at least one storage device may store a set of instructions. When executing the set of instructions, the at least one processor may be configured to perform the process for security inspection, e.g., operations 301-303 of process 300, operations 501-503 of process 500, operations 701-705 of process 700, etc.

Figure 11:
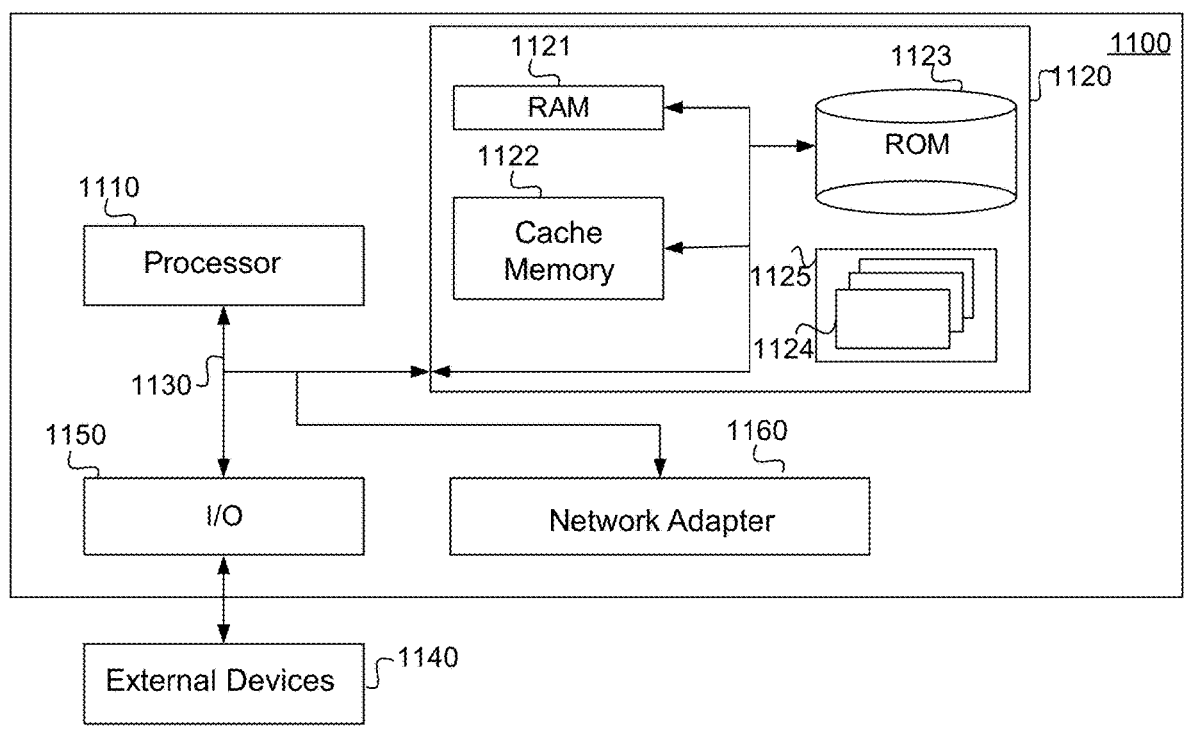
FIG. 11 is a schematic diagram illustrating an exemplary computing device according to some embodiments of the present disclosure.

FIG. 11 is a schematic diagram illustrating an exemplary computing device 1100 according to some embodiments of the present disclosure. As shown in FIG. 11, the computing device 1100 may be a general purpose computer or a special purpose computer. The computing device 1100 may include a processor 1110, a storage device 1120, and a bus 1130.

The bus 1130 may be configured to connect different components of the computing device 1100. For example, the bus 1130 may connect the processor 1110 and the storage device 1120. The bus 1130 may include a storage bus, a storage controller, a peripheral bus, a processor, a local bus, or the like, or any combination thereof.

The storage device 1120 may include a volatile read and write memory (e.g., a random access memory (RAM) 1121, a cache memory 1122, or the like), a read only memory (ROM) 1123, or the like.

In some embodiments, the storage device 1120 may also include a program apparatus 1125 including a set of program modules 1124. The program modules 1124 may include an operation system, one or more applications, program data, or other program modules, each or some combination of which may be implemented by a network.

The computing device 1100 may communicate with one or more external devices 1140 (e.g., a keyboard, a mouse, etc.). The computing device 1100 may also communicate with a device that can facilitate the communication between the computing device 1100 and a user, or a device (e.g., a router, a modem, etc.) that can facilitate the communication between the computing device 1100 and one or more other computing devices, etc. The communication may be implemented via the I/O interface 1150. In some embodiments, the computing device 1100 may communicate with one or more networks (e.g., a local area network (LAN), a wide area network (WAN), etc.) via a network adapter 1160. As shown in FIG. 11, the network adapter 1160 may communicate with other modules of the computing device 1100 via the bus 1130. It should be noted that the computing device 1100 may be implemented via other hardware and/or software modules, including but not limited to microcode, a device driver, a redundant processor, an external disk drive array, a RAID system, a tape driver, a data backup storage system, or the like.

In some embodiments, various aspects of the present disclosure may be implemented as program products. The program products may include program codes. When the program codes run on a computing device, the program codes may be configured to cause the computing device to perform the process for security inspection, e.g., operations 301-303 of process 300, operations 501-503 of process 500, operations 701-705 of process 700, etc.

The program products may be a combination of one or more readable media. The readable medium may include a readable signal medium, a readable storage medium, or the like. The readable storage medium may include but is not limited to an electronic system or device, a magnetic system or device, an optical system or device, an electromagnetism system or device, an infrared ray system or device, a semiconductor system or device, or the like, or any combination thereof. For example, the readable storage medium may include electrical connection with one or more wires, a portable disk, a hard disk, a random access memory (RAM), a read only memory (ROM), an erasable programmable read only memory (EPROM), a flash memory, an optical fiber, a portable compact disk read only memory (CD-ROM), an optical storage device, a magnetic storage device, or the like, or any combination thereof.

In some embodiments, various aspects of the present disclosure may be implemented by a CD-ROM. The CD-ROM may include program codes which can run on a computing device. It should be noted that the above listed readable storage medium is not intended to limit the scope of the present disclosure. In the present disclosure, the readable storage medium may be any tangible medium including or storing programs. The programs may be used by an instruction execution system or device.

The readable signal medium may include data signals that are propagated in a baseband or as a part of a carrier, which carries readable program codes. Such propagated data signals may apply a variety of forms, including but not limited to, electromagnetic signals, optical signals, or the like, or a combination thereof. The readable signal medium may be any readable medium other than the readable storage medium that can send, propagate, transport programs used by the instruction execution system or device.

Figure 12:
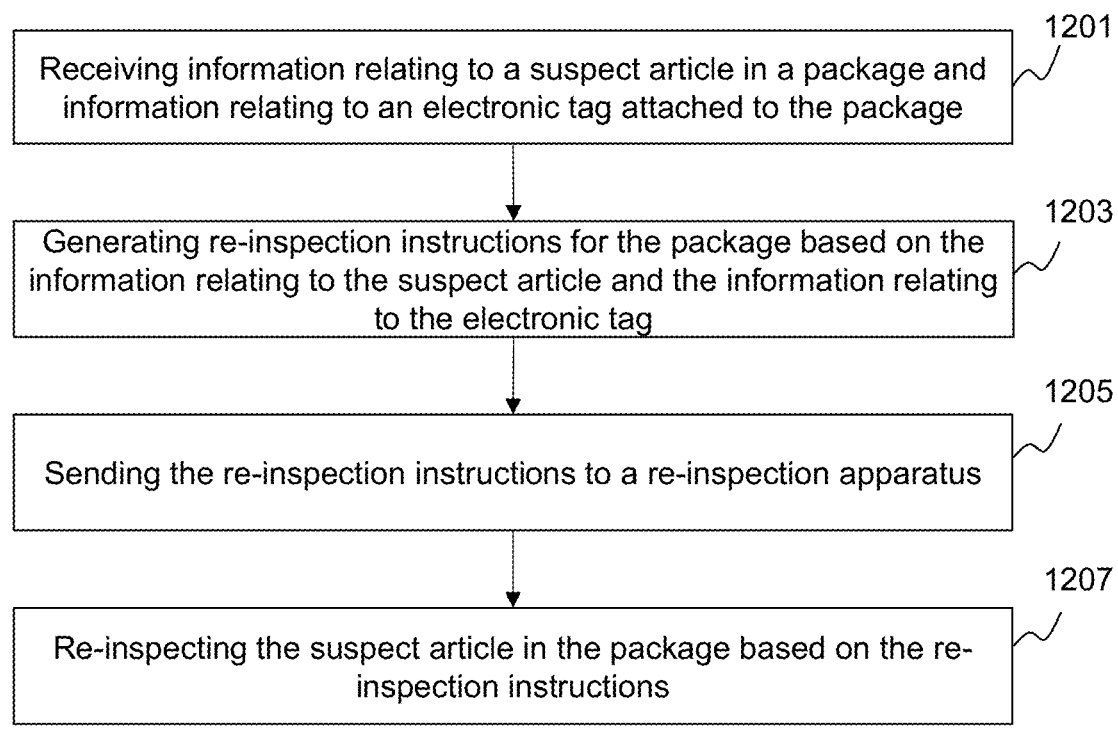
FIG. 12 is a flowchart illustrating an exemplary process for security inspection according to some embodiments of the present disclosure.

FIG. 12 is a flowchart illustrating an exemplary process 1200 for security inspection according to some embodiments of the present disclosure. In some embodiments, the process 1200 may be executed by the security inspection system 100. However, one of ordinary skill in the art would understand that the process 1200 may also be performed by other entities. In some embodiments, one or more operations in the process 1200 may be stored in a storage device (e.g., the storage device in the security inspection system 100, the RAM 1121, the cache memory 1122, the ROM 1123, etc.) in the form of instructions, and invoked and/or executed by the security inspection system 100. In some embodiments, the instructions may be transmitted in the form of electronic current or electrical signals.

In 1201, information relating to a suspect article in a package and information relating to an electronic tag attached to the package may be received by a monitoring platform (e.g., the monitoring platform 150). The information relating to the suspect article may be generated by a security inspection machine (e.g., the security inspection machine 110). In some embodiments, the security inspection machine 110 may capture a first image of the package by scanning the package with X-ray. The first image may be a transmission image that can reflect one or more articles in the package. The security inspection machine 110 may determine whether a suspect article is in the package based on the first image. If it is determined that a suspect article is in the package, the security inspection machine 110 may identify information relating to the suspect article (e.g., the number of suspect articles, the type of each suspect article, the shape of each suspect article, or the like). The security inspection machine 110 may send the information relating to the suspect article to the monitoring platform 150 via a network (e.g., the network 180), and send labelling instructions to a labelling apparatus (e.g., the labelling apparatus 120) via the network 180. The labelling apparatus 120 may attach an electronic tag for the package based on the labelling instructions. In some embodiments, the electronic tag may include a bar code, a two-dimensional code, a RFID, a specific pattern, or the like. The labelling apparatus 120 may send the information relating to the electronic tag to the monitoring platform 150 via the network 180. In some embodiments, the package may be delivered to a re-inspection apparatus (e.g., the re-inspection apparatus 140) by a distribution apparatus (e.g., the distribution apparatus 130). In some embodiments, the distribution apparatus 130 may be a mechanical arm, a push rod, or the like.

In 1203, re-inspection instructions for the package may be generated by the monitoring platform 150 based on the information relating to the suspect article and the information relating to the electronic tag. In 1205, the re-inspection instructions may be sent, by the monitoring platform 150, to the re-inspection apparatus 140. In some embodiments, the monitoring platform may send the re-inspection instructions to the re-inspection apparatus via the network 180.

In 1207, the suspect article in the package may be re-inspected by the re-inspection apparatus 140 based on the re-inspection instructions. In some embodiments, the re-inspection apparatus may identify the package based on the information relating to the electronic tag in the re-inspection instructions. For example, the re-inspection apparatus 140 may identify the package by comparing the electronic tag of the package with the information relating to the electronic tag in the re-inspection instructions. The re-inspection apparatus 140 may re-inspect the suspect article in the package based on the information relating to the suspect article in the re-inspection instructions. For example, the re-inspection apparatus 140 may detect an article to be re-inspected in the package. The article may be, e.g., automatically by a mechanical arm or manually by a user (e.g., the owner of the package), taken out of the package and positioned on the re-inspection apparatus 140. The re-inspection apparatus 140 may generate a fourth image of the article to be re-inspected. The fourth image may be a visible light image, an infrared image, a holographic image, or the like. The re-inspection apparatus 140 may compare the fourth image with the first image of the suspect article. In response to a determination that the article to be re-inspected is the suspect article based on the comparison result, the re-inspection apparatus 140 may re-inspect the article. Alternatively, in response to a determination that the article to be re-inspected is not the suspect article based on the comparison result, the re-inspection apparatus 140 may output a prompt for repositioning the suspect article.

In some embodiments, the re-inspection apparatus 140 may include a plurality of re-inspection components, each of which configured to inspect a type of suspect articles. Merely by way of example, the re-inspection components may include a tool re-inspection component, a liquid re-inspection component, an explosive re-inspection component, a drug re-inspection component, a radioactive substance re-inspection component, or the like, or any combination thereof. In some embodiments, the monitoring platform 150 may determine a target re-inspection component corresponding to the suspect article among the plurality of re-inspection components. The suspect article may be re-inspected by the target re-inspection component. If the suspect article is determined as a contraband based on a re-inspection result, the suspect article may be confiscated by a confiscation component of the re-inspection apparatus 140.

In some embodiments, the re-inspection apparatus 140 may re-inspect the suspect article with the assistance of a user. The security inspection machine 110 may also obtain a second image (an appearance image) of the package by photographing the package. In some embodiments, the second image may be a visible light image, an infrared image, a holographic image, or the like. In some embodiments, the security inspection machine 110 may send the second image of the package and the first image including the suspect article to the monitoring platform 150 via the network 180. The monitoring platform 150 may then send, via the network 180, the first image and the second image to a display screen (e.g., the display screen 160) for display. In some embodiments, the monitoring platform 150 may perform an image matting for the suspect article in the first image to obtain a processed first image, and send, via the network 180, the processed first image to the display screen 160 for display. In some embodiments, the monitoring platform 150 may obtain a third image (an appearance image) of the target re-inspection component which is captured by the re-inspection apparatus 140, and send, via the network 180, the third image of the target re-inspection component to the display screen 160 for display. It should be noted that the security inspection machine 110 can directly send, via the network 180, the first image and the second image to the display screen for display. Similarly, the re-inspection apparatus 140 may directly send, via the network 180, the third image of the target re-inspection component to the display screen 160 for display. By viewing the display screen 160, the user may easily know which article in the package is a suspect article and easily identify the target re-inspection component, which may facilitate the user to place the suspect article on the target re-inspection component for re-inspection. In some embodiments, the monitoring platform 150 may be configured to determine a display mode of the information relating to the suspect article and the third image of the target re-inspection component. The display screen 160 may display the information relating to the suspect article and the third image of the target re-inspection component based on the display mode. Exemplary display mode may refer to, e.g., FIG. 2 and the descriptions thereof.

In some embodiments, there may be one or more suspect articles in the package. Thus, it is required to ensure all suspect articles in the package have been re-inspected. In some embodiments, the re-inspection apparatus 140 may send a re-inspection result to the monitoring platform 150 via the network 180. The monitoring platform 150 may determine a correspondence of the information relating to the electronic tag and the information relating to the suspect article, and set a security status of the electronic tag as pending. The correspondence may be represented by an association table (e.g., Table 1 in FIGS. 1A and 1B). The monitoring platform 150 may determine whether all suspect articles in the package have been re-inspected based on the re-inspection result and the correspondence. If one or more suspect articles are not be re-inspected, the monitoring platform 150 may send second re-inspections for the one or more suspect articles to the re-inspection apparatus 140. Alternatively, if all the suspect articles have been re-inspected, the monitoring platform 150 may update the security status of the electronic tag as inspected. More descriptions may be found elsewhere in the present disclosure (e.g., FIGS. 1A and 1B, and the relevant descriptions thereof).

It should be noted that the above description regarding the process 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, to further verify whether all suspect articles in the package have been re-inspected, the package after being re-inspected may be detected by an electronic tag detection apparatus (e.g., the electronic tag detection apparatus 170). If the electronic tag is detected, the electronic tag detection apparatus 170 may send the information of the electronic tag to the monitoring platform 150. The monitoring platform 150 may determine the security status of the electronic tag. If the security status of the electronic tag is pending, the monitoring platform 150 may send alarm instructions to the electronic tag detection apparatus 170. The electronic tag detection apparatus 170 may output alarm information based on the alarm instructions. The alarm information may be used to remind a security staff that one or more suspect articles in the package have not been re-inspected. Alternatively, if the security status of the electronic tag is inspected, the monitoring platform 150 may not send the alarm instructions to the electronic tag detection apparatus 170. Then the package may leave the security inspection region.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

STATEMENT OF INVENTION

1. A security inspection system, comprising a security inspection machine, a labelling apparatus, a distribution apparatus, a re-inspection apparatus, and a monitoring platform, wherein:
   the security inspection machine is configured to:
      perform an X-ray imaging on a package to be inspected and obtain an X-ray image of the package; and
      if it is determined that a suspect article is in the package based on the X-ray image, send labelling instructions to the labelling apparatus and send information relating to the suspect article to the monitoring platform;
   the labelling apparatus is configured to:
      attach an electronic tag for the package based on the labelling instructions; and
      send information relating to the electronic tag of the package to the monitoring platform;
   the distribution apparatus is configured to deliver the package with the electronic tag to the re-inspection apparatus;
   the monitoring platform is configured to:
      generate re-inspection instructions based on the information relating to the electronic tag and the information relating to the suspect article; and send the re-inspection instructions to the re-inspection apparatus; and the re-inspection apparatus is configured to:
- identify the package based on the information relating to the electronic tag in the re-inspection instructions; and
- re-inspect the suspect article in the package based on the information relating to the suspect article in the re-inspection instructions.

2. The system of item 1, further comprising a display screen; wherein:
the security inspection machine is further configured to:
- acquire an appearance image of the package by photographing the package; and
- send the appearance image and the X-ray image of the package to the monitoring platform; and the monitoring platform is further configured to send the appearance image, the X-ray image, and the information relating to the suspect article to the display screen for display.

3. The system of item 2, wherein the monitoring platform is further configured to, after performing an image matting for the suspect article in the X-ray image to obtain a processed X-ray image, send the processed X-ray image to the display screen for display.

4. The system of item 2, wherein the re-inspection apparatus includes a plurality of re-inspection components, each of which configured to inspect a type of suspect articles; wherein:
the monitoring platform is further configured to:
- determine a re-inspection component corresponding to the suspect article among the plurality of re-inspection components;
- obtain an appearance image of the re-inspection component; and
- send the appearance image of the re-inspection component to the display screen; and the display screen is further configured to display the appearance image of the re-inspection component corresponding to the suspect article.

5. The system of item 4, wherein the monitoring platform is further configured to determine a display mode of the information relating to the suspect article and the appearance image of the re-inspection component corresponding to the suspect article, the display mode being used to highlight the information relating to the suspect article and the appearance image of the re-inspection component corresponding to the suspect article; and
the display screen is configured to display the information relating to the suspect article and the appearance image of the re-inspection component corresponding to the suspect article according to the display mode.

6. The system of item 1, wherein the re-inspection apparatus is further configured to:
after identifying the package according to the information relating to the electronic tag in the re-inspection instructions, detect an article to be re-inspected in the package;
after the article to be re-inspected is detected, generate a visible light image of the article to be re-inspected;
compare the visible light image with the X-ray image of the suspect article in the re-inspection instructions; and
if it is determined that the article to be re-inspected is the suspect article in the package based on the comparison result, re-inspect the article according to the information relating to the suspect article in the re-inspection instructions.

7. The system of item 6, wherein the re-inspection apparatus is further configured to:
if it is determined that the article to be re-inspected is not the suspect article in the package based on the comparison result, output a prompt for repositioning the suspect article.

8. The system of item 1, wherein the re-inspection apparatus includes a confiscation component, and
the confiscation component is configured to, if the suspect article is determined as a contraband based on a re-inspection result, confiscate the suspect article.

9. The system of any one of items 1-8, wherein the re-inspection apparatus is further configured to send a re-inspection result to the monitoring platform.

10. The system of item 9, wherein the monitoring platform is further configured to:
store a correspondence of the information relating to the electronic tag and the information relating to the suspect article;
set a security status of the electronic tag of the package as pending;
receive the re-inspection result sent by the re-inspection apparatus;
determine whether all suspect articles in the package have been re-inspected based on the re-inspection result and the stored correspondence;
if one or more suspect articles are not re-inspected, determine the one or more suspect articles in the package, and send second re-inspection instructions for the one or more suspect articles to the re-inspection apparatus; or
if all the suspect articles in the package have been re-inspected, update the security status of the electronic tag as inspected according to the re-inspection result.

11. The system of item 10, further comprising:
an electronic tag detection apparatus configured to:
- detect the electronic tag of the package that leaves a security inspection region, and
- if the electronic tag is detected, send the information relating to the electronic tag to the monitoring platform;

the monitoring platform configured to
- determine the security status of the electronic tag, and
- if the security status of the electronic tag is pending, send alarm instructions to the electronic tag detection apparatus; and the electronic tag detection apparatus further configured to output alarm information based on the alarm instructions.

12. A security inspection method, comprising:
receiving information relating to a suspect article in a package to be inspected sent by a security inspection machine and information relating to an electronic tag sent by a labelling apparatus;
generating re-inspection instructions based on the information relating to the electronic tag and the information relating to the suspect article; and
sending the re-inspection instructions to a re-inspection apparatus, so that the re-inspection apparatus identifies the package based on the information relating to the electronic tag in the re-inspection instructions and re-inspects the suspect article in the package based on the information relating to the suspect article in the re-inspection instructions.

13. The method of item 12, further comprising:
receiving an appearance image and an X-ray image of the package sent by the security inspection machine; and sending the appearance image and the X-ray image of the package to a display screen for display.

14. The method of item 13, wherein sending the X-ray image to the display screen for display comprises:
after performing an image matting for the suspect article in the X-ray image to obtain a processed X-ray image, sending the processed X-ray image to the display screen for display.

15. The method of item 13, further comprising:
determining a re-inspection component corresponding to the suspect article;
obtaining an appearance image of the re-inspection component; and
sending the appearance image of the re-inspection component to the display screen for display.

16. The method of item 15, further comprising:
determining a display mode of the information relating to the suspect article and the appearance image of the re-inspection component corresponding to the suspect article, the display mode being used to highlight the information relating to the suspect article and the appearance image of the re-inspection component corresponding to the suspect article, so that the display screen displays the information relating to the suspect article and the appearance image of the re-inspection component corresponding to the suspect article according to the display mode.

17. The method of item 12, further comprising:
storing a correspondence of the information relating to the electronic tag and the information relating to the suspect article;
setting a security status of the electronic tag as pending;
receiving a re-inspection result for the suspect article sent by the re-inspection apparatus;
determining whether all suspect articles in the package have been re-inspected based on the re-inspection result and the stored correspondence;
if one or more suspect articles are not re-inspected, determining the one or more suspect articles in the package, and sending second re-inspection instructions for the one or more suspect articles to the re-inspection apparatus; or
if all the suspect articles in the package have been re-inspected, updating the security status of the electronic tag as inspected according to the re-inspection result.

18. The method of item 17, further comprising:
receiving the information relating to the electronic tag detected by an electronic tag detection apparatus;
determining the security status of the electronic tag sent by the electronic tag detection apparatus;
if the security status of the electronic tag is pending, sending alarm instructions to the electronic tag detection apparatus, so that the electronic tag detection apparatus outputs alarm information based on the alarm instructions.

19. A security inspection method, comprising:
receiving re-inspection instructions sent by a monitoring platform;
identifying a package to be inspected based on information relating to an electronic tag in the re-inspection instructions; and
re-inspecting a suspect article in the package based on information relating to the suspect article in the re-inspection instructions.

20. The method of item 19, wherein:
after identifying the package based on the information relating to the electronic tag in the re-inspection instructions, the method further comprises:
detecting an article to be re-inspected;
generating a visible light image of the article to be re-inspected after the article to be re-inspected is detected;
comparing the visible light image with an X-ray image of the suspect article in the re-inspection instructions; and
the identifying the package based on the information relating to the electronic tag in the re-inspection instructions, and the re-inspecting the suspect article in the package based on the information relating to the suspect article in the re-inspection instructions comprises:
if it is determined that the article to be re-inspected is the suspect article in the package based on the comparison result, re-inspecting the article according to the information relating to the suspect article in the re-inspection instructions.

21. The method of item 20, further comprising:
if it is determined that the article to be re-inspected is not the suspect article in the package based on the comparison result, outputting a prompt for repositioning the suspect article.

22. The method of item 19, further comprising:
if the suspect article is determined as a contraband based on a re-inspection result, confiscating the suspect article.

23. A security inspection method, comprising:
detecting an electronic tag of a package that leaves a security inspection region;
if the electronic tag is detected, send information relating to the electronic tag to a monitoring platform;
receiving alarm instructions sent by the monitoring platform; and
outputting alarm information based on the alarm instructions.

24. A security inspection device, comprising:
a first receiving module configured to receive information relating to a suspect article in a package to be inspected sent by a security inspection machine and information relating to an electronic tag sent by a labelling apparatus; and
a first sending module configured to:
generate re-inspection instructions based on the information relating to the electronic tag and the information relating to the suspect article; and
sending the re-inspection instructions to a re-inspection apparatus, so that the re-inspection apparatus identifies the package based on the information relating to the electronic tag in the re-inspection instructions and re-inspects the suspect article in the package based on the information relating to the suspect article in the re-inspection instructions.

25. The device of item 24, further comprising:
a second receiving module configured to receive an appearance image and an X-ray image of the package sent by the security inspection machine; and
a second sending module configured to send the appearance image and the X-ray image of the package to a display screen for display.

26. The device of item 25, wherein the second sending module configured to, after performing an image matting for the suspect article in the X-ray image to obtain a processed X-ray image, send the processed X-ray image to the display screen for display.

27. The device of item 25, further comprising a third sending module configured to:
  determine a re-inspection component corresponding to the suspect article;
  obtain an appearance image of the re-inspection component; and
  send the appearance image of the re-inspection component to the display screen for display.

28. The device of item 27, further comprising a display mode determination module configured to:
  determine a display mode of the information relating to the suspect article and the appearance image of the re-inspection component corresponding to the suspect article, the display mode being used to highlight the information relating to the suspect article and the appearance image of the re-inspection component corresponding to the suspect article, so that the display screen displays the information relating to the suspect article and the appearance image of the re-inspection component corresponding to the suspect article according to the display mode.

29. The device of item 24, further comprising:
  a storage module configured to store a correspondence of the information relating to the electronic tag and the information relating to the suspect article;
  a first security status determination module configured to set a security status of the electronic tag as pending;
  a third receiving module configured to receive a re-inspection result for the suspect article sent by the re-inspection apparatus;
  a re-inspection determination module configured to determine whether all suspect articles in the package have been re-inspected based on the re-inspection result and the stored correspondence;
  a fourth sending module configured to, if one or more suspect articles are not re-inspected, determine the one or more suspect articles in the package, and send second re-inspection instructions for the one or more suspect articles to the re-inspection apparatus; or
  a second security status determination module configured to, if all the suspect articles in the package have been re-inspected, update the security status of the electronic tag as inspected according to the re-inspection result.

30. The device of item 29, further comprising:
  a fourth receiving module configured to receive the information relating to the electronic tag detected by an electronic tag detection apparatus;
  a determination module configured to determine the security status of the electronic tag sent by the electronic tag detection apparatus; and
  a fifth sending module configured to, if the security status of the electronic tag is pending, send alarm instructions to the electronic tag detection apparatus, so that the electronic tag detection apparatus outputs alarm information based on the alarm instructions.

31. A security inspection device, further comprising:
  a re-inspection instruction receiving module configured to receive re-inspection instructions sent by a monitoring platform; and
  a re-inspection module configured to:
    identify a package to be inspected based on information relating to an electronic tag in the re-inspection instructions; and
    re-inspect a suspect article in the package based on information relating to the suspect article in the re-inspection instructions.

32. The device of item 31, further comprising:
  a detection module configured to detect an article to be re-inspected after the re-inspection module identifies the package based on the information relating to the electronic tag in the re-inspection instructions;
  a visible light image determination module configured to generate a visible light image of the article to be re-inspected after the article to be re-inspected is detected;
  a comparison module configured to compare the visible light image with an X-ray image of the suspect article in the re-inspection instructions; and
  the re-inspection module configured to, if it is determined that the article to be re-inspected is the suspect article in the package based on the comparison result, re-inspect the article according to the information relating to the suspect article in the re-inspection instructions.

33. The device of item 32, further comprising:
  a prompt module configured to, if it is determined that the article to be re-inspected is not the suspect article in the package based on the comparison result, output a prompt for repositioning the suspect article 34. The device of item 31, further comprising:
  a confiscation module configured to confiscate the suspect article if the suspect article is determined as a contraband based on a re-inspection result.

35. A security device, comprising:
  an electronic tag detection module configured to:
    detect an electronic tag of a package that leaves a security inspection region; and
    if the electronic tag is detected, send information relating to the electronic tag to a monitoring platform;
  a security status receiving module configured to receive alarm instructions sent by the monitoring platform; and
  an alarm module configured to output alarm information based on the alarm instructions.

36. A computer readable medium, storing computer executable instructions, wherein the computer executable instructions are configured to perform the method of any one of items 12-23.

37. A computing device, including at least one processor, and a storage device in communication with the processor, the storage device including a set of instructions, wherein when executing the set of instructions, the at least one processor is configured to perform the method of any one of items 12-23.

What is claimed is:
1. An article security inspection system, comprising a re-inspection apparatus and a monitoring platform, wherein:
  the monitoring platform include a processor and the processor of the monitoring platform is configured to:
    receive information relating to a suspect article in a package and information relating to an electronic tag attached to the package;
    generate re-inspection instructions for the package based on the information relating to the suspect article and the information relating to the electronic tag;
    send the re-inspection instructions to the re-inspection apparatus; and
    send a first image of the package that is obtained by scanning the package with X-rays and a second image of the package that is obtained by photograph- ing the package to a display screen for display to an owner of the package; and the re-inspection apparatus includes a plurality of components and at least part of the plurality of components is configured to re-inspect the suspect article in the package based on the re-inspection instructions, wherein:
the information relating to the suspect article is generated and sent by a security inspection machine;
the information relating to the electronic tag is generated and sent by a labelling apparatus;
the package with the electronic tag is delivered to the re-inspection apparatus by a distribution apparatus; and
the processor of the monitoring platform is further configured to obtain an appearance image of a target component corresponding to the suspect article in the plurality of components, and send the appearance image of the target component to the display screen for display to the owner of the package.

2. The system of claim 1, further comprising the security inspection machine, the security inspection machine being configured to capture the first image of the package by scanning the package with X-rays.

3. The system of claim 1, wherein the processor of the monitoring platform is further configured to:
perform an image matting for the suspect article in the first image to obtain a processed first image; and
send the processed first image to the display screen for display.

4. The system of claim 1, wherein each of the plurality of components being configured to inspect a type of suspect articles, wherein the processor of the monitoring platform is further configured to:
determine the target component corresponding to the suspect article among the plurality of components.

5. The system of claim 4, wherein:
the processor of the monitoring platform is further configured to determine a display mode of the information relating to the suspect article and the third image of the target component; and
the display screen is configured to display the information relating to the suspect article and the third image of the target component based on the display mode.

6. The system of claim 4, wherein to re-inspect the suspect article in the package based on the re-inspection instructions, the re-inspection apparatus is further configured to:
identify the package based on the information relating to the electronic tag in the re-inspection instructions by a processor; and
re-inspect the suspect article in the package based on the information relating to the suspect article in the re-inspection instructions by the target component.

7. The system of claim 6, wherein to re-inspect the suspect article, the re-inspection apparatus is configured to:
compare a fourth image of an article to be re-inspected with the first image of the package by a processor, wherein the fourth image is a visible light image of the article to be re-inspected; and
in response to a determination that the article to be re-inspected is the suspect article based on the comparison result, re-inspect the article by the target component; or
in response to a determination that the article to be re-inspected is the suspect article based on the comparison result, output a prompt for guiding the user to reposition the suspect article by a processor.

8. An article security inspection method implemented on a computing device having at least one processor, at least one computer-readable storage medium, and a communication platform connected to a network, the at least one processor is configured to:
receive information relating to a suspect article in a package and information relating to an electronic tag attached to the package;
generate re-inspection instructions for the package based on the information relating to the suspect article and the information relating to the electronic tag;
send the re-inspection instructions to a re-inspection apparatus; and
send a first image of the package that is obtained by scanning the package with X-rays and a second image of the package that is obtained by photographing the package to a display screen for display to an owner of the package;
wherein:
the re-inspection apparatus includes a plurality of components and at least part of the plurality of components is configured to re-inspect the suspect article in the package based on the re-inspection instructions;
the information relating to the suspect article is generated and sent by a security inspection machine;
the information relating to the electronic tag is generated and sent by a labelling apparatus; and
the package with the electronic tag is delivered to the re-inspection apparatus by a distribution apparatus; and
the at least one processor is further configured to obtain an appearance image of a target component corresponding to the suspect article in the plurality of components, and send the appearance image of the target component to the display screen for display to the owner of the package.

9. The method of claim 8, further comprising capturing, by the security inspection machine, the first image of the package by scanning the package with X-ray.

10. The method of claim 8, the at least one processor is further configured to:
perform an image matting for the suspect article in the first image to obtain a processed first image; and
send the processed first image to the display screen for display.

11. The method of claim 8, the at least one processor is further configured to:
determine the target component corresponding to the suspect article among the plurality of components in the re-inspection apparatus.

12. The method of claim 11, further comprising:
determining, by the at least one processor, a display mode of the information relating to the suspect article and the third image of the target component; and
displaying, by the display screen, the information relating to the suspect article and the third image of the target component based on the display mode.

13. The method of claim 11, wherein the re-inspect the suspect article in the package based on the re-inspection instructions comprises:
identifying, by a processor, the package based on the information relating to the electronic tag in the re-inspection instructions; and
re-inspecting, by the target component, the suspect article in the package based on the information relating to the suspect article in the re-inspection instructions.

14. The method of claim 13, wherein the re-inspecting the suspect article comprises:
- comparing, by a processor, a fourth image of an article to be re-inspected with the first image of the package, wherein the fourth image is a visible light image of the article to be re-inspected; and
- in response to a determination that the article to be re-inspected is the suspect article based on the comparison result, re-inspecting, by the target component, the article; or
- in response to a determination that the article to be re-inspected is the suspect article based on the comparison result, output a prompt for guiding the user to reposition the suspect article by a processor.

15. The method of claim 8, further comprising:
- confiscating, by a confiscation component, the suspect article in response to determining that the suspect article is determined as a contraband.

16. The method of claim 8, the at least one processor is further configured to:
- obtain a re-inspection result;
- determine a correspondence of the information relating to the electronic tag and the information relating to the suspect article;
- set a security status of the electronic tag as pending;
- determine whether all suspect articles in the package have been re-inspected based on the re-inspection result and the correspondence;
- in response to determining that one or more suspect articles are not been re-inspected, send second re-inspection instructions for the one or more suspect articles to the re-inspections apparatus; or
- in response to determining that all the suspect articles have been re-inspected, update the security status of the electronic tag as inspected.

17. The method of claim 16, further comprising:
- detecting, by an electronic tag detection apparatus, the electronic tag of the package after being re-inspected;
- in response to determining that the electronic tag is detected, sending, by the electronic tag detection apparatus, the information of the electronic tag to the at least one processor;
- determining, by the at least one processor, the security status of the electronic tag;
- in response to determining that the security status of the electronic tag is pending, sending, by the at least one processor, alarm instructions to the electronic tag detection apparatus; and
- outputting, by the electronic tag detection apparatus, alarm information based on the alarm instructions.

18. A non-transitory computer-readable storage medium for realizing the safety inspection of article, comprising at least one set of instructions, wherein when executed by at least one processor of a computing device, the at least one set of instructions directs the at least one processor to perform acts of:
- receiving information relating to a suspect article in a package and information relating to an electronic tag attached to the package;
- generating re-inspection instructions for the package based on the information relating to the suspect article and the information relating to the electronic tag;
- sending the re-inspection instructions to a re-inspection apparatus; and
- sending a first image of the package that is obtained by scanning the package with X-rays and a second image of the package that is obtained by photographing the package to a display screen for display to an owner of the package;

wherein:
- the re-inspection apparatus includes a plurality of components and at least part of the plurality of components is configured to re-inspect the suspect article in the package based on the re-inspection instructions;
- the information relating to the suspect article is generated and sent by a security inspection machine;
- the information relating to the electronic tag is generated and sent by a labelling apparatus; and
  - the package with the electronic tag is delivered to the re-inspection apparatus by a distribution apparatus; and
- the at least one set of instructions further directs the at least one processor to perform obtaining an appearance image of a target component corresponding to the suspect article in the plurality of components, and sending the appearance image of the target component to the display screen for display to the owner of the package.

* * * * *